United States Patent [19]
Alexander et al.

[11] Patent Number: 6,005,251
[45] Date of Patent: Dec. 21, 1999

[54] VOICE COIL SCANNER FOR USE IN SCANNING PROBE MICROSCOPE

[75] Inventors: John D. Alexander, Sunnyvale; Marco Tortonese, Mountain View; Thai Nguyen, Sunnyvale, all of Calif.

[73] Assignee: Thermomicroscopes Corp., Sunnyvale, Calif.

[21] Appl. No.: 09/119,808

[22] Filed: Jul. 21, 1998

Related U.S. Application Data

[63] Continuation-in-part of application No. 08/916,571, Aug. 22, 1997, Pat. No. 5,861,624.

[51] Int. Cl.⁶ ..................................................... H01J 37/26
[52] U.S. Cl. ...................................................... 250/442.11
[58] Field of Search ............................... 250/442.11, 306

[56] References Cited

U.S. PATENT DOCUMENTS 4,977,544 12/1990 Karaki et al. ............................... 367/7
4,977,779 12/1990 Karaki et al. ............................... 73/606
5,861,624 1/1999 Alexander et al. ........................ 250/306

*Primary Examiner*—Kiet T. Nguyen
*Attorney, Agent, or Firm*—David J. Weitz; Wilson Sonsini Goodrich & Rosati

[57] ABSTRACT

A scanning mechanism is provided for use in a scanning probe microscope. The scanning mechanism includes a stationary portion; a moveable portion; a plurality of springs attaching the moveable portion to the fixed portion, the plurality of springs providing tension against movement of the moveable portion relative to the stationary portion, the tension provided by the plurality of springs having a substantially linear spring constant over a scan distance; and one or more voice coils attached to either the moveable portion or the stationary portion for moving the moveable portion relative to the stationary portion in one or more orthogonal directions.

30 Claims, 20 Drawing Sheets

VOICE COIL SCANNER FOR USE IN SCANNING PROBE MICROSCOPE

RELATIONSHIP TO COPENDING APPLICATION

This application is a continuation-in-part of U.S. patent application Ser. No. 08/916,571; filed: Aug. 22, 1997, now U.S. Pat. No. 5,861,624, entitled "Atomic Force Microscope for Attachment to Optical Microscope" all of which is incorporated herein by reference.

FIELD OF THE INVENTION

The present invention relates to devices and methods for incorporating atomic force microscopy capabilities into an optical microscope and applications resulting therefrom. The present invention also relates to the use of voice coil scanners and disk scanners in scanning probe microscopes.

BACKGROUND OF THE INVENTION

Devices are needed which can provide both quantitative information about the topography of a sample through atomic force microscopy and optical image information.

Atomic force microscopes have been designed which attach directly to the lens turret of a standard optical microscope. For example, the DUALSCOPE™, manufactured by DME (Danish Micro Engineering) is an AFM with a built-in objective lens. The DUALSCOPE™ mounts directly onto a lens turret of an optical microscope.

The DUALSCOPE™ uses an optical beam bounce detection system. A significant disadvantage of coupling an AFM which uses an optical beam bounce detection system to an optical microscope, such as the DUALSCOPE™, is that the laser beam obscures and distorts the optical view. Laser light from the detection system scatters light both from the cantilever and the sample which distorts the field of view.

A further disadvantage of using an optical beam bounce detection system is the use of the lenses for optical imaging to also focus laser light onto the back of the cantilever. Laser light in an AFM is typically red light of a specific wavelength, whereas an optical microscope is designed to focus white light. Two different focal lengths are therefore required, one for the red light which is focused onto the back of the cantilever, and another for white light which must be focused onto the sample which is about 2 to 4 $\mu$m below the cantilever due to its thickness and the length of the tip. If the optics used in the AFM are designed primarily to focus the laser light, the optical clarity of the optical view is degraded. If the optics are designed primarily to provide a high quality optical view, the degree that the laser light is focused on the cantilever is compromised. As a result, the spot on the cantilever is larger and more diffuse. The unfocused laser spot leads to greater laser light scattering from the cantilever which degrades the optical view. In addition, there is greater laser light scattering from the sample, which is not distinguishable from light reflected from the cantilever. As a result, the photodetector detects both sources of scattered light, leading to interference and other noise in the SPM image.

In the case of the DUALSCOPE™, the optical view is focused at infinity, also referred to as "infinity corrected." This allows the device to be installed on different standard optical microscopes. However, by focusing the optical view at an image at infinity, both the red laser light and white light for the optical view are focused at the same point. This inherently requires that the optical view and/or the laser focus be degraded.

The DUALSCOPE™ provides simultaneous SPM and optical viewing by incorporating optics within a piezoelectric tube scanner. Because the optics are positioned in the piezoelectric tube scanner, the optics are scanned with the SPM. This design also severely compromises the optical quality of the optical view that is provided. For example, the DUALSCOPE™ does not allow simultaneous use of all optical modes of an optical microscope, including other optical contrast techniques such as confocal microscopy, phase contrast microscopy, differential interference contrast microscopy, and Hoffman/modulation contrast microscopy.

Positioning the optics within the scanner tube, as in the DUALSCOPE™, also limits the types and quality of lenses which may be used. A scanner tube is too long to allow the AFM to be mounted below a standard working distance objective lens. The longest standardly available working distance objectives which mount on standard optical microscope turrets typically have working distances on the order of 1" and a 10–20×magnification (limited by the Rayleigh criterion, i.e., diffraction limited) and are very expensive. Therefore on-axis optics must be placed within or below the scanner tube and must also be scanned. These constraints limit the diameter of the lenses which then limit the numerical aperture of the lens. By limiting the numerical aperture of the lens, the resolving power of the optics and the depth of focus are limited which leads to more spherical aberrations in the image. Having to position the optics within the tube scanner also limits how heavy the lens can be which affects the resonant frequency of the AFM, which is preferably high. The quality of the lenses which may be used is also limited by the constraint of having to position the optics within the tube scanner. For example, for a given field of view, the resolution, depth of focus, and severity of spherical aberration all are worse with smaller diameter lenses. In addition, needing to position the optics within the tube scanner as opposed to using optics which are already being used on the optical microscope increase the costs associated with the device.

Another disadvantage associated with positioning the optics within the scanner tube is the degree of magnification which the optics provide. For example, the degree of total magnification provided by the series of optics used in combination with the DUALSCOPE™ is specified as 25×. A higher level of magnification is needed for many applications. For example, semiconductor defect inspection systems and defect review systems require a lateral resolution of 1 $\mu$m or less which requires 400–1000×magnification. Current semiconductor defects, and even the semiconductor devices themselves, can be 1 $\mu$m or less in size. The optical resolution provided by an AFM such as the DUALSCOPE™ which uses optical beam bounce can be on the order of greater than 5 $\mu$m. With an optical resolution on the order of 5–10 $\mu$m, these devices poorly resolve the cantilever itself, let alone the sample.

A further disadvantage of positioning the optics within the scanner tube is that the optical view tracks the motion of the probe. As a result, the probe remains fixed in the field of view. Hence, it is not possible to scan a probe within a stationary optical field of view. This limitation makes probe positioning difficult.

Another AFM which has been developed for use in combination with an optical microscope is the ULTRA OBJECTIVE™, manufactured by Surface Imaging Systems. The ULTRA OBJECTIVE™ does not include a built-in objective lens which mounts directly onto a lens turret. As a result, the ULTRA OBJECTIVE™ does not enable simultaneous SPM and optical imaging. Instead, it is necessary to switch between the AFM and an objective lens.

The ULTRA OBJECTIVE™ uses laser interferometry to detect cantilever deflection and is designed to be compatible with only Zeiss optical microscopes.

Given the large number of instruments in existence with optical microscopy capabilities, a need also exists for a device which can introduce atomic force microscopy into these existing instruments in order to avoid the capital costs associated with purchasing a new instrument having combined atomic force microscopy and optical microscopy capabilities. The device should rapid switching between atomic force microscopy and optical imaging and should preferably enable simultaneous atomic force microscopy and optical imaging. The device should also preserve the optical clarity, functionality, and resolution that is provided by the instrument.

These and other advantages are provided by the SPMs of the present invention.

SUMMARY OF THE INVENTION

The present invention relates to a compact scanning probe microscope system which is designed to be incorporated into or attachable to an objective lens which can be mounted on a lens turret of an optical microscope such that simultaneous atomic force microscopy and optical viewing of a sample through the objective lens can be performed. The present invention also relates to the use of voice coil scanners and disk scanners in scanning probe microscopes.

In one embodiment, a scanning probe microscope (SPM) is designed to be removably attached to a standard objective lens of an optical microscope. According to this embodiment, the SPM system includes an objective mounting adaptor including a mechanism for removably attaching the objective mounting adaptor to an optical microscope objective and a SPM assembly attached to the objective mounting adaptor.

The SPM assembly includes a SPM mounting adaptor attached to the objective mounting adaptor, a SPM assembly end cap attached to the SPM mounting adaptor, the end cap and mounting adaptor defining a space therebetween, and a SPM positioned within the space.

In one variation of this embodiment, the SPM includes a scanning mechanism for scanning a probe relative to a sample, and a probe support attached to the scanning mechanism which is scanned with the scanning mechanism. The probe support includes a probe package mounting mechanism for holding a probe package containing a probe for probing the sample. In the case of AFM, the probe may include a cantilever with an AFM probe attached. According to this variation, the objective mounting adaptor and SPM assembly each include an optically transmissive region through which an optical view of the sample can be obtained by the microscope objective.

In another variation of this embodiment, the SPM includes a disk scanner for scanning a probe relative to a sample, and a probe support attached to the disk scanner which is scanned with the disk scanner, the probe support including a probe package mounting mechanism for holding a probe package containing a probe for probing the sample.

In another variation of this embodiment, the SPM includes a scanning mechanism for scanning a probe relative to a sample, a probe support attached to the scanning mechanism which is scanned with the scanning mechanism, the probe support including a probe package mounting mechanism for holding a probe package, and a probe package containing a self-sensing cantilever and probe for probing the sample. Examples of self-sensing cantilevers which can be used include, but are not limited to, piezoresistive cantilevers and capacitance sensing cantilevers.

In any of the above variations, the SPM assembly can include a spring biasing mechanism positioned in the space for biasing the SPM against the SPM assembly end cap.

The SPM systems of this embodiment are designed to be mounted directly onto an optical microscope objective where the optics native to the objective can be used to provide an optical view of the sample. In addition, these SPM systems are designed to preserve the optical clarity, functionality, and resolution normally provided by the objective when the SPM system is not attached. For example, the optical image provided by the optical microscope is designed to be minimally distorted by scanner elements and detector elements, other than what is obscured by the cantilever itself. The SPM systems of this embodiment are also designed to be compatible with many commercially available objective lenses of different manufacturers provided that they satisfy the minimum working distance requirements.

The SPM systems of this embodiment are preferably designed to be coupled to the optical microscope objective such that the optics which provide the optical view are above and independent of the scanning mechanism and detection mechanism of the SPM. In this regard, the SPM systems of this embodiment are preferably designed so that the optical view provided by the objective does not scan with the SPM, i.e., the optical view remains stationary as the SPM is scanned back and forth over the sample.

According to another embodiment, the SPM system is designed to be removably attached to an optical microscope and includes integrated optics for providing an optical view. In this embodiment, the optics are used solely for generating an optical view and/or other optical contrast mechanisms and are not used in conjunction with a detection mechanism of the SPM. According to this embodiment, the SPM system includes an SPM mounting adaptor for removably attaching the SPM system to the optical microscope, an objective lens for providing an optical view of a sample, a SPM assembly end cap attached to the SPM mounting adaptor, the end cap and mounting adaptor defining a space therebetween, and a SPM positioned in the space.

In one variation, the SPM includes a scanning mechanism for scanning a probe relative to a sample, and a probe support attached to the scanning mechanism which is scanned with the scanning mechanism, the probe support including a probe package mounting mechanism for holding a probe package containing a probe for probing the sample. According to this variation, the SPM assembly end cap and scanning mechanism include optically transmissive regions through which a stationary optical view of the sample can be obtained by the objective lens during a scan of the sample.

In another variation, the SPM includes a disk scanner for scanning a probe relative to a sample, and a probe support attached to the disk scanner which is scanned with the scanning mechanism, the probe support including a probe package mounting mechanism for holding a probe for probing the sample.

In yet another variation, the SPM includes a scanning mechanism for scanning a probe relative to a sample, and a probe support attached to the scanning mechanism which is scanned with the scanning mechanism, the probe support including a probe package mounting mechanism for holding a probe package containing a self-sensing cantilever and probe for probing the sample. Examples of self-sensing cantilevers which can be used include, but are not limited to, piezoresistive cantilevers, capacitance sensing cantilevers, and rocking beam sensors.

In yet another embodiment, a scanning mechanism is provided for scanning a sample relative to a stationary probe. The scanning mechanism according to this embodiment may be a disk scanner or voice coil scanner.

One advantage of all the SPM systems of the present invention is their compatibility with 20×or greater objective lenses. A further advantage of the SPM systems of the present invention is that lenses with large numerical apertures can be used. For example, lenses of 0.35 or greater can be used with the SPM systems of the present invention. The SPM should provide a lateral resolution of 1 µm or less so that it can be used with semiconductor defect inspection systems and defect review systems.

A further advantage of all the SPM systems of the present invention is their ability to provide an SPM integrated with an optical microscope with a completely unaffected and/or unobstructed optical views.

The present invention also relates to the use of voice coil scanners and disk scanners in scanning probe microscopes.

In one embodiment, a voice coil scanner is provided for use in a scanning probe microscope which includes a fixed, stationary portion and a moveable portion, the moveable portion being attached to the fixed portion by one or more springs. The scanner further includes one or more voice coils attached to either the fixed or moveable portion for moving the moveable portion relative to the fixed portion against tension provided by the one or more springs.

The voice coil scanner may be incorporated into a scanning stage on which a sample may be placed, the scanning stage serving to move a sample relative to a stationary probe. According to this embodiment, the scanning stage includes a fixed, stationary portion and a moveable portion on which a sample may be placed. The moveable portion is attached to the fixed portion by one or more springs which allow the moveable portion to be moved under tension provided by the one or more springs relative to the fixed portion. The scanner also includes one or more voice coils attached to either the fixed or moveable portion for moving the moveable portion relative to the fixed portion against tension provided by the one or more springs.

The voice coil scanner may also be incorporated into a scanning probe microscope head, the scanner serving to move a probe relative to a stationary sample. According to this embodiment, the scanning probe microscope head includes a fixed, stationary portion and a moveable portion to which a probe is either attached or is attachable. The moveable portion is attached to the fixed portion by one or more springs which allow the moveable portion to be moved under tension provided by the one or more springs relative to the fixed portion. The scanning probe microscope head also includes one or more voice coils attached to either the fixed or moveable portion for moving the moveable portion relative to the fixed portion against tension provided by the one or more springs.

The voice coil scanner may also be incorporated into an atomic force microscope which is designed to be incorporated into or attachable to an objective lens of an optical microscope.

The voice coil scanners of the present invention enable scanning over a scan distance of at least 5 mm, more preferably at least 10 mm and more preferably at least 30 mm. The voice coil scanners also enable scanning with precision to less than about $1 \times 10^{-9}$ m.

According to any one of the above embodiments, the springs attaching the moveable portion to the fixed portion should have a substantially uniform spring constant over the distance that the spring is translated (e.g., bent, extended or contracted). The springs should also be substantially rigid in at least one direction orthogonal to a direction or directions that the spring is translated. Also according to any one of the above embodiments, the voice coils are preferably driven by a current source.

Disk scanners are also provided for use in scanning probe microscopes. Disk scanners may be incorporated into a scanning stage on which a sample may be placed, the scanning stage serving to move a sample relative to a stationary probe. Disk scanners may also be incorporated into a scanning probe microscope head, the scanner serving to move a probe relative to a stationary sample. Disk scanners may also be incorporated into an atomic force microscope which is designed to be incorporated into or attachable to an objective lens of an optical microscope.

BRIEF DESCRIPTION OF THE DRAWINGS

FIG. 1A illustrates a breakaway depiction of the assembly of a SPM system according to the present invention and a mechanism for its attachment to an microscope objective.

FIG. 1B illustrates the microscope objective, objective mounting adaptor and SPM assembly illustrated in FIG. 1A attached to each other.

FIG. 1C illustrates the objective mounting adaptor 16 with screws for laterally moving the SPM assembly relative to the mounting adaptor.

FIG. 1D provides a top down view of the objective mounting adaptor.

FIG. 1E provides a top down view of the SPM assembly.

FIG. 2A illustrates a breakaway depiction of a SPM system incorporated onto a microscope objective which may be attached to a turret of an optical microscope.

FIG. 2B illustrates a top-down view of the microscope objective illustrated in FIG. 2A.

FIG. 3A provides a breakaway depiction of a SPM assembly.

FIG. 3B illustrates the SPM assembly illustrated in FIG. 3A.

FIG. 3C illustrates an embodiment of the SPM assembly illustrated in FIG. 3A.

FIG. 3D illustrates a bottom up view of the SPM assembly illustrated in FIG. 3A.

DETAILED DESCRIPTION OF THE PREFERRED EMBODIMENT

Figure 1A:
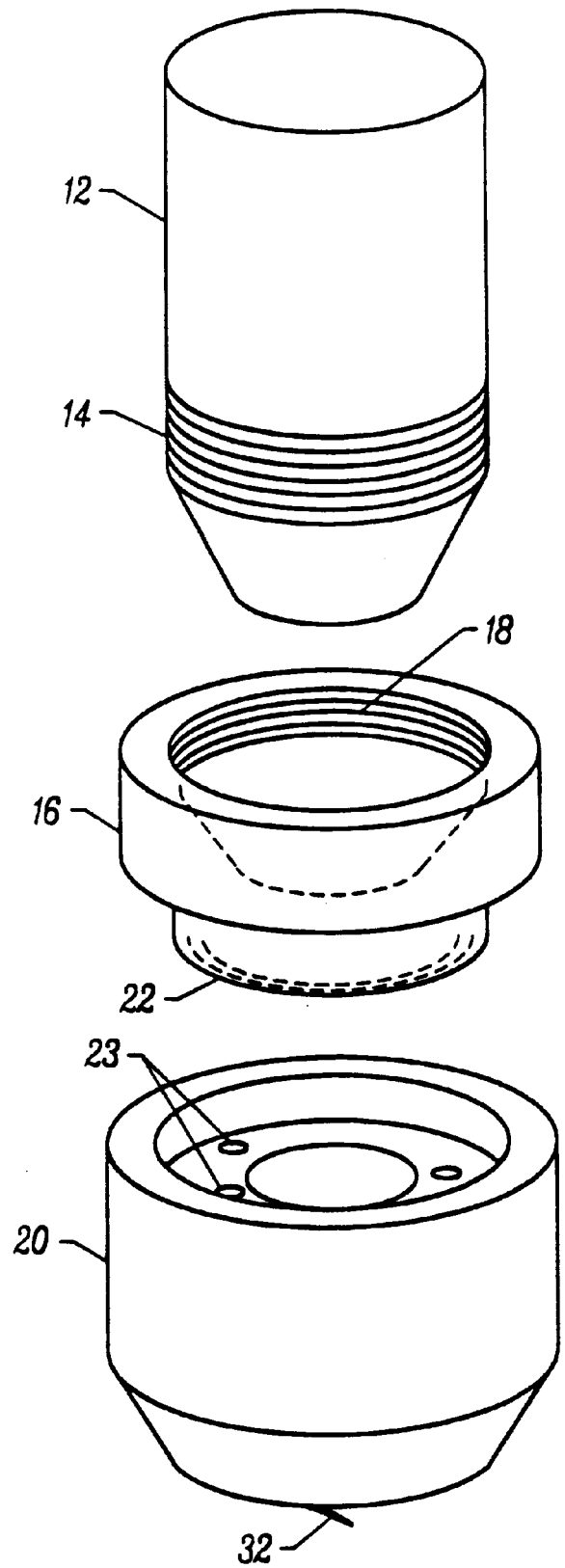
FIGS. 1A–1E illustrate an embodiment of a SPM according to the present invention which is designed to be removably attached to a microscope objective of an optical microscope.

The present invention relates to scanning probe microscope systems which can be attached to or integrated into an objective of an optical microscope. The present invention also relates to the use of voice coil scanners and disk scanners in scanning probe microscopes.

A scanning probe microscope refers to a microscope which can perform any form of scanning probe microscopy. Examples of types of scanning probe microscopy include, but are not limited to, atomic force microscopy and scanning tunneling microscopy. Atomic force microscope (AFM) systems can operate in any AFM mode including, for example, contact AFM, non-contact AFM, intermittent-contact AFM, MFM (magnetic force microscopy), FMM (force modulation microscopy and phase detection, for information on surface hardness and viscoelasticity), phase detection, EFM (electrostatic force microscopy), other AC modes of operation, and LFM (lateral force microscopy, for friction information).

Given the large number of instruments in existence with optical microscopy capabilities, SPM systems of the present invention which introduce scanning probe microscopy into these existing instruments provide the significant advantage of enabling users to avoid the capital costs associated with purchasing a new instrument having combined atomic force microscopy and optical microscopy capabilities.

In one embodiment, the SPM system is designed to be removably attached to a standard objective lens of an optical microscope including, for example, optical microscopes manufactured by Nikon, Leica, Zeiss, Olympus, Mitatoyo, and others. The ability to attach the SPM system of the present invention to an optical microscope significantly reduces the cost and design constraints associated with using a separate SPM in combination with a separate optical microscope. In addition, the SPM systems of the present invention are preferably designed to be combined with many if not all existing optical microscopes. As a result, existing optical microscopes can be readily upgraded to include atomic force microscopy capabilities, thus avoiding the need for existing optical microscope owners to purchase a new optical microscope with combined SPM—optical microscopy capabilities.

SPM systems according to the present invention which can be removably attached to a standard objective lens of an optical microscope are preferably designed to fit on the microscope objective and match the working distance of the objective so that the probe and sample are in focus during SPM operation. In this regard, the overall length that the SPM extends below the objective to the probe should be the same as the working distance of the microscope objective. In general, the minimum working distance objective lens which can be used with a SPM of the present invention is determined by the width of the probe holder, the SPM scanning mechanism, probe and the z range of motion of the SPM scanning mechanism. Standard microscope objectives commonly have working distances of about 20 mm or less. Accordingly, the SPM preferably extends below the objective to the probe a distance of about 20 mm or less, as measured from the probe to the back side of the distal end of the microscope objective. In a preferred variation of this embodiment, the SPM is mounted on the objective such that the length that the SPM extends below the objective to the probe can be adjusted. For example, the SPM system may be attached to the microscope objective using a mounting adaptor which can be screwed onto the objective to a variable length from the end of the microscope objective. This embodiment allows the user to switch between other objective lenses on the lens turret which provide different magnifications, as well as to switch to the SPM system for performing scanning probe microscopy.

In another embodiment, the SPM system incorporates its own objective lens, the combined SPM and objective lens system being mountable directly on a lens turret of an optical microscope. This embodiment also allows the user to switch between other objective lenses on the lens turret which provide different magnifications, as well as to switch to the SPM for performing scanning probe microscopy.

In another embodiment, the SPM system does not include an objective lens and is mountable directly on a lens turret of an optical microscope. This embodiment allows the user to switch between other objective lenses on the lens turret which provide different magnifications, as well as to switch to the SPM system for performing scanning probe microscopy.

The SPM systems of the present invention, with or without its own objective lens, may be designed such that simultaneous optical viewing and SPM imaging can be performed. According to this embodiment, the SPM system is preferably designed such that it does not substantially obstruct the optical view of the sample and/or probe provided by the microscope objective. By this design, simultaneous 2-dimensional optical imaging of a sample surface using the objective and 3-dimensional topographical imaging by the SPM is enabled. Also enabled according to this embodiment are other optical imaging contrast modes such as optical modes of an optical microscope, including other optical contrast techniques such as confocal microscopy, phase contrast microscopy, differential interference contrast microscopy, fluorescence microscopy, and Hoffman/modulation contrast microscopy. By being able to perform these different modes, the SPMs of this invention provide vertical measurement capabilities along with increased lateral resolution relative to optical imaging Incorporation of a SPM onto a microscope objective according to the present invention enables the user to quickly obtain quantitative information about the topography of a sample in addition to obtaining a 2-dimensional optical image of the sample. Further, the SPM system is designed to be readily added to a microscope objective or a microscope turret, thereby making its incorporation into an optical microscope, or a larger apparatus which includes an optical microscope, simple and efficient.

In one embodiment, the SPM system employs a disk scanner for moving the probe relative to the sample. Disk scanners provide the significant advantage of being very thin. As a result, the use of a disk scanner in a SPM system of the present invention enables short working distances between the microscope objective and sample.

In another embodiment, the SPM system employs a voice coil scanner for moving a probe relative to the sample or visa versa. Voice coils have lower noise electronics than piezoelectric tube scanners and can easily produce a much larger scan range. Voice coil scanners also have a lower degree of scanning nonlinearity. Voice coil scanner can be thinner than disk scanners and do not require the additional height of the support ring.

The SPM systems of the present invention may be incorporated into larger apparati which include an optical microscope, such as optical review and inspection systems used in the semiconductor industry. Such apparati include off-line manually operated tools, and automated in-line tools used in manufacturing facilities. As a result, SPM functionality can be added to these tools without the need for a stand-alone SPM or its related costs. Since the SPM systems of the present invention may be mounted on an apparatus with existing wafer handling capabilities, the need for expensive wafer transport and other peripheral systems which would be necessary with a separate stand alone SPM is avoided. The SPM systems of the present invention also avoid the need to add to the footprint of the existing apparatus, as a stand alone SPM system does. Furthermore, by combining the SPM and optical microscope in a single instrument, the inspection time required is reduced. For example, a combined SPM/optical microscope instrument allows for more rapid defect inspection and avoids having to visually locate a defect and then relocate the same defect in a separate SPM. The combined SPM and optical microscope of the present invention may also make it possible to eliminate the need for other review equipment, such as a scanning electron microscope, thereby further reducing the cost of operation.

The present invention also relates to methods and devices for attaching a SPM system to an optical microscope as well as methods for using a SPM mounted on an optical microscope objective or turret in combination with the optical microscope.

In a preferred variation of any of the above embodiments, the SPM systems of the present invention employ a piezoresistive cantilever to sense the surface of the sample. The design and operation of piezoresistive cantilevers is described in U.S. Pat. Nos. 5,595,942, 5,483,822 and 5,345,815 each of which are incorporated herein by reference.

The use of piezoresistive cantilevers in the SPM systems of the present invention facilitate greater instrument automation than standard commercially available SPMs which use optical detection methods, such as a laser optical beam bounce detection system. For example, piezoresistive cantilever detection systems are composed of a single, self sensing component, i.e., a piezoresistive cantilever. With only a single component, no alignment of the detection system is needed. As a result, the piezoresistive cantilevers provide higher throughput and require less tip calibration time. In addition to piezoresistive cantilevers, other types of self-sensing cantilevers, such as capacitance sensing cantilevers, are also preferred for use in the present invention.

By contrast to piezoresistive cantilevers, conventional optical beam bounce detection systems require careful fine alignment of the laser beam with the associated mirrors and optical detectors which is difficult and slow. Conventional optical beam bounce detection systems also have the disadvantages of laser safety requirements which complicate manufacturing and additional optics and alignment mechanisms for the laser. Laser and PSPD (position-sensitive photodetector) are also bulkier than piezoresistive cantilevers and can be incompatible with photosensitive samples.

Because piezoresistive cantilever detection systems involve a single component, designing an AFM such that a top down optical view is provided by the microscope objective which is not obstructed by the detection system is also facilitated. Accordingly, simultaneous optical viewing and AFM detection is facilitated by the use of a piezoresistive cantilever or other self-sensing cantilever, including use of optical imaging contrast modes.

When used in combination with an optical microscope according to the present invention, piezoresistive cantilever detection systems provide the further advantage of enabling short working distances to be employed.

SPM systems of the present invention may be used in a wide variety of applications, including metrology, defect review, critical dimension measurements such as film thickness and pitch, optical inspection, surface roughness measurements, and others. The SPM systems of the present invention can be incorporated in a variety of apparati including, but not limited to ultra-fast review stations, standard optical microscopes, inverted optical microscopes, and others. The SPM systems of present invention are particularly useful in optical inspection applications where the working distance and footprint of the apparatus needs to be minimized or when it is necessary to obtain a high magnification optical view in combination with profiling of a surface. SPM systems of the present invention have applications in a variety of areas including, but not limited to integrated circuit manufacturing, semiconductor CMP (chemical-mechanical polishing), storage media such as magnetic hard disks, biological studies, and metallurgy. When piezoresistive cantilevers are employed, the SPM systems of the present invention may be used in conjunction with the processing of materials which are sensitive to laser light since no laser light is used.

AFM systems of the present invention can operate in a variety of different modes including, for example, contact AFM, non-contact AFM, intermittent-contact AFM, MFM (magnetic force microscopy), FMM (force modulation microscopy and phase detection, for information on surface hardness and viscoelasticity), phase detection, EFM (electrostatic force microscopy), other AC modes of operation, and LFM (lateral force microscopy, for friction information). By using a conducting probe, such as a conducting cantilever tip or a metallic tip, scanning tunneling microscopy can also be performed in combination with atomic force microscopy and/or optical imaging.

FIGS. 1A–1F illustrate an embodiment of an SPM system according to the present invention which is designed to be removably attached to a standard objective lens of an optical microscope. FIG. 1A illustrates a breakaway depiction of the assembly of an SPM system according to the present invention and a mechanism for its attachment to a microscope objective. As illustrated, a microscope objective 12 has threading 14 to which a cover ring is standardly connected to the microscope objective. Also illustrated is an objective mounting adaptor 16 with threading 18 complementary to the threading 14 on the microscope objective 12 such that the objective mounting adaptor 16 can be screwed onto the objective 12. It is noted that a variety of different sized objective mounting adapters can be used which are designed to attach to commercially available microscope objectives. Although the objective mounting adaptor is illustrated as attaching to the microscope objective by a complementary screw-nut arrangement, it should also be noted that other mechanisms for attaching the objective mounting adaptor to any commercially available microscope objective may also be used, including, for example, magnets, clips, clamps, clamping screws, and the like.

Also illustrated in FIG. 1A is a SPM assembly 20 which is attachable to the objective mounting adaptor 16. The SPM assembly 20 includes a probe 32 which extends from the SPM assembly and can be used to perform scanning probe microscopy upon the sample 24. As illustrated in FIG. 1A, the objective mounting adaptor 16 includes a magnet 22 and the SPM assembly 20 includes a ferromagnetic material 23 which causes the SPM assembly 20 to be retained by the magnet 22. It should be understood that the magnet— ferromagnetic arrangement illustrated in FIG. 1A could be reversed. Furthermore, while a magnetic mechanism for attaching the mounting adaptor 16 to the SPM assembly 20 is illustrated, it should be noted that any mechanism for removably attaching the objective mounting adaptor 16 to the SPM assembly 20 may be used. Alternatively, the objective mounting adaptor 16 and SPM assembly 20 may permanently attached to each other.

Figure 1B:
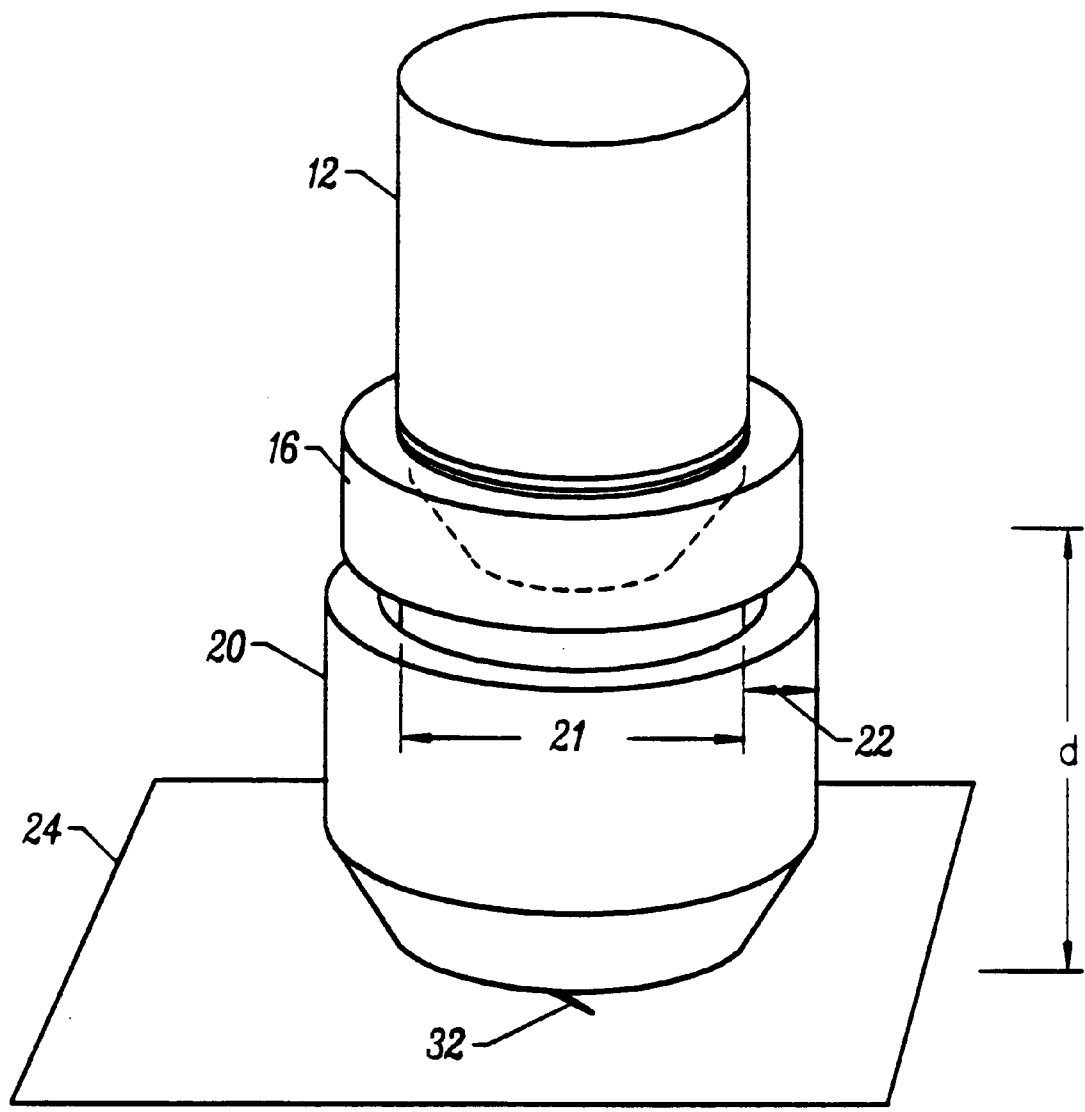

FIG. 1B illustrates the microscope objective 12, objective mounting adaptor 16 and SPM assembly 20 attached to each other. As illustrated, the length (d) which the SPM assembly extends from the distal end of the microscope objective 12 toward the sample is preferably equal to or less than the working distance of the microscope objective so that the SPM can fit between the objective lens and sample when the sample is positioned at the working distance for the objective lens. The distance (d) that the SPM assembly 20 extends from the microscope objective 12 is also preferably variable so that the SPM can be lowered into contact with the sample, for example, by adjusting the height at which the mounting adaptor 16 is attached to the microscope objective 12. Adjusting the height at which the mounting adaptor 16 is attached to the microscope objective 12 can be accomplished, for example, by screwing or unscrewing more or less. Once the probe is in focus, the position of the mounting adaptor may, if desirable, be locked in place, for example, using a set screw.

In a preferred embodiment, illustrated in FIG. 1B, the objective mounting adaptor 16 and SPM assembly 20 are sized such that the inner diameter 21 of the mounting adaptor is sufficiently narrow to provide clearance for x and y sliding motion of the SPM assembly 20 against the surface of the mounting adaptor 16. As a result, the lateral position of the mounting adaptor 16 can be adjusted (arrow 22) relative to the SPM assembly 20. This allows the user to align the probe 32 within the optical field of view provided by the optical microscope. This feature is advantageous for use in combination with autofocusing mechanisms and pattern recognition which rely on the probe being positioned within a particular region of the optical view. This feature also allows the user to align the probe 32 with a particular surface feature visible in the optical view provided by the microscope objective. In one embodiment, the mounting adaptor 16 and SPM assembly 20 are sized such that the SPM assembly 20 can be moved at least 3 mm or more relative to the mounting adaptor 16.

The mounting adaptor 16 and SPM assembly 20 are also designed to allow the SPM assembly 20 to rotate as much as 360 degrees or more relative mounting adaptor 16 and to the sample. Being able to rotate the SPM assembly allows the user to rotate the cantilever to obtain an SPM image of a particular sample area using a different cantilever orientation, for instance to check for imaging artifacts that are due to tip orientation, or to rotate the cantilever arm so that it does not obscure a feature in the optical image.

Figure 1C:
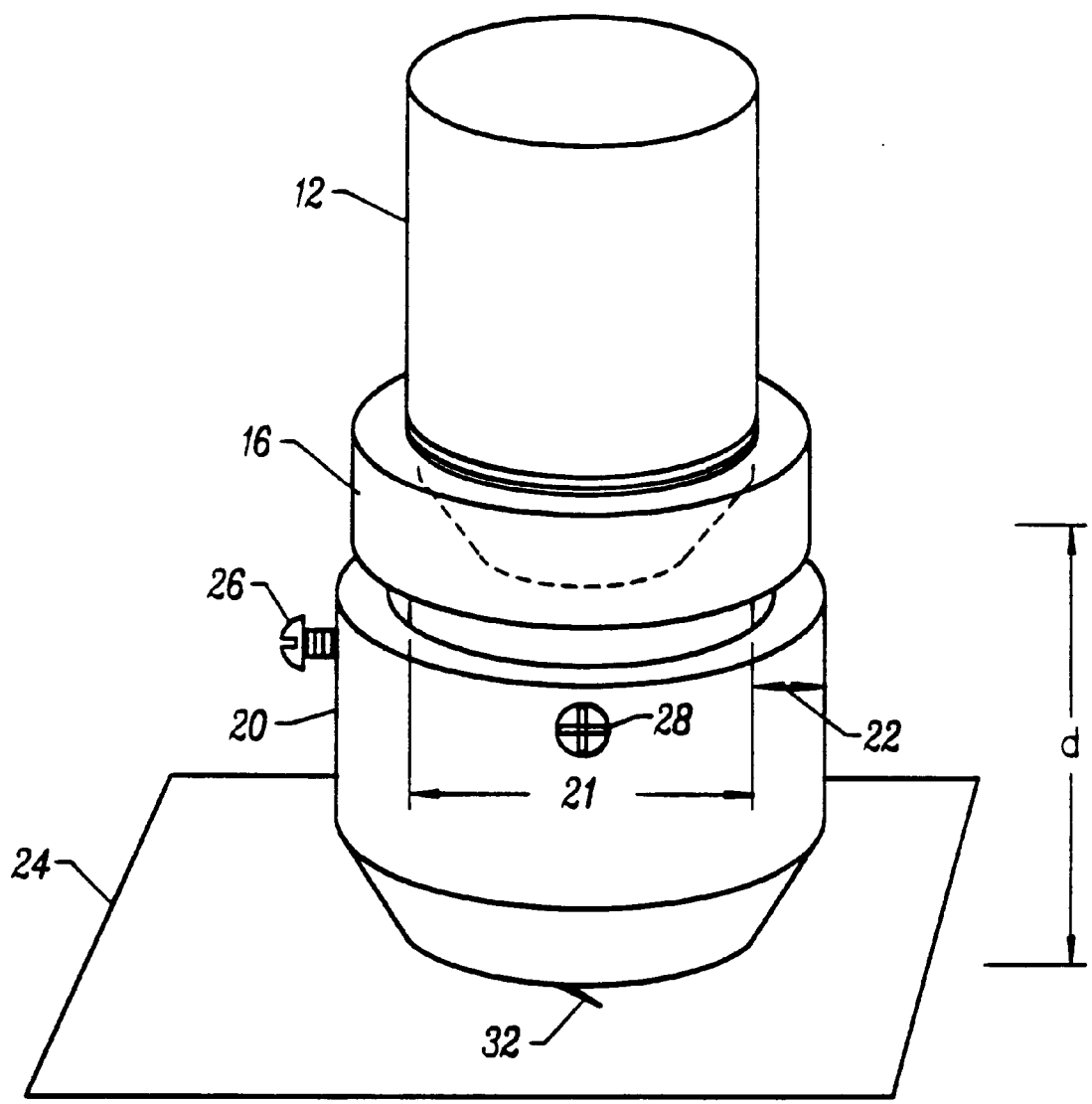

Adjustment of the lateral position of the objective mounting adaptor 16 relative to the SPM assembly 20 may be performed manually (e.g., with fingers) or by a mechanical mechanism (e.g., motorized). For example, as illustrated in FIG. 1C, the objective mounting adaptor 16 or the SPM assembly 20 may include screws 26,28 which can be used to laterally move the SPM assembly 20 relative to the mounting adaptor 16.

Use of a magnetic attachment mechanism as illustrated in FIG. 1A, in combination with the lateral adjustment mechanisms described above, has the advantage of being conducive for use in clean room environments, such as in the semiconductor industry, where any particles generated by friction due to sliding the objective mounting adaptor relative to the SPM assembly can be trapped by the magnets.

As illustrated in FIG. 1B, the SPM assembly 20 includes a probe 32 which extends from the SPM assembly and can be used to perform scanning probe microscopy upon the sample 24. Further discussion of the probe 32 and the operation of the SPM is provided herein.

Figure 1D:
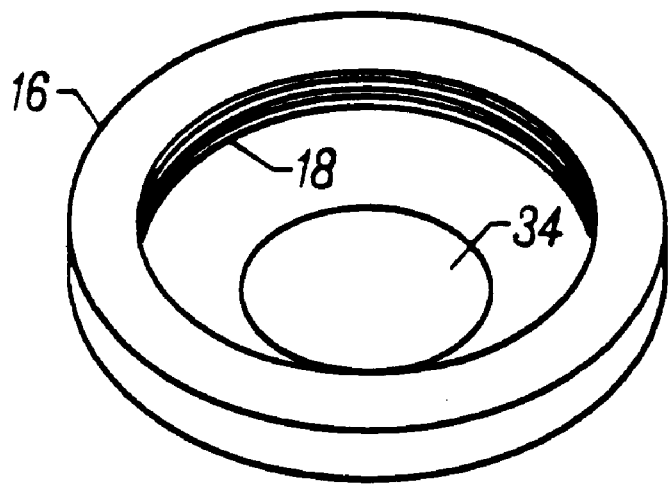
Figure 1E:
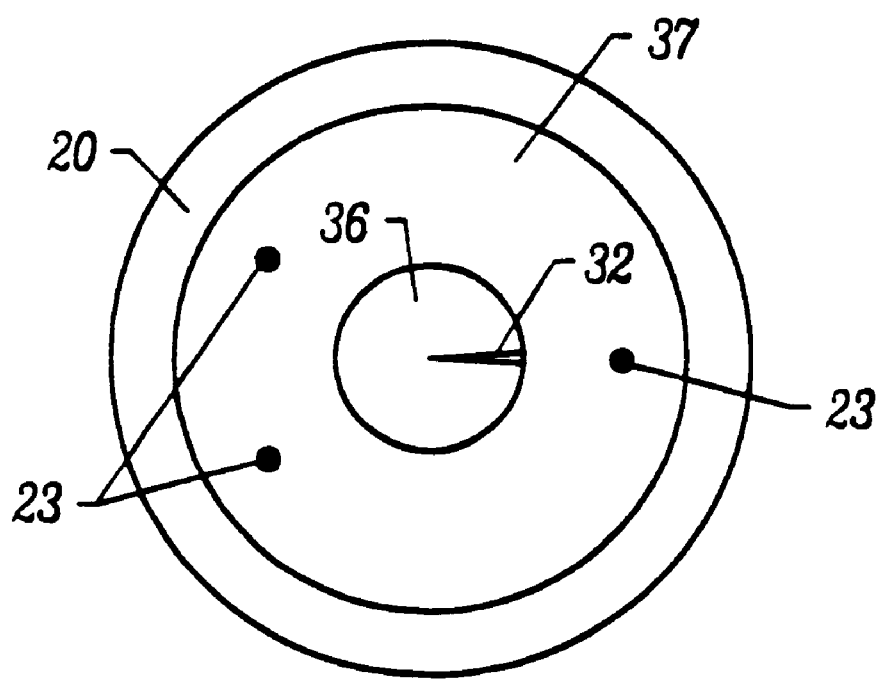

FIGS. 1D–1E provide top down views of preferred embodiments of the objective mounting adaptor 16 and SPM assembly 20 respectively which enable simultaneous optical viewing of a sample and scanning probe imaging or scanning of a sample. As illustrated in FIG. 1D, the objective mounting adaptor 16 preferably includes an optically transmissive region 34 which, when the objective mounting adaptor 16 is attached to the microscope objective 12, does not obstruct the optical view provided by the microscope objective 12. As a result, optical viewing through the microscope objective 12 is possible despite attachment of the objective mounting adaptor 16 to the microscope objective 12. While an optical view can be obtained despite partial obstruction, minimizing the degree to which the objective mounting adaptor does obstruct the microscope objective is preferred. In one embodiment, the optical view provided is completely unobstructed. The optically transmissive region 34 may simply be a hole in the objective mounting adaptor 16 or a layer of transparent material (e.g., glass slide, lens, etc.).

As illustrated in FIG. 1E, the SPM assembly 20 also preferably includes an optically transmissive region 36 which, when the objective mounting adaptor 16 and SPM assembly 20 are attached to the microscope objective 12, does not obstruct the optical view provided by the microscope objective. As a result, optical viewing through the microscope objective is possible despite attachment of the objective mounting adaptor 16 and SPM assembly 20 to the microscope objective 12. While an optical view can be obtained despite partial obstruction, minimizing the degree to which the SPM assembly obstructs the microscope objective is preferred. In one embodiment, the optical view provided is completely unobstructed. The optically transmissive region 36 may simply be a hole in the mounting adaptor 16 or a layer of transparent material (e.g., glass slide, lens, etc.).

As illustrated in FIG. 1E, the probe 32 is preferably within the field of view provided by the microscope objective 12. As a result, optical viewing of a surface area can be performed simultaneously with the performance of scanning probe imaging or scanning of that surface area. In some instances, complete scanning probe imaging of the surface area is desired. In other instances, a partial scan, for example to locate a particular defect quickly, or a line scan, can be performed. All these forms of scanning probe analysis of a surface area can be performed in combination with optical viewing according to the present invention.

As illustrated in FIG. 1A, the SPM assembly 20 may include a ferromagnetic material 22 which causes the SPM assembly 20 to be retained by a magnet 23 on the objective mounting adaptor 16, or visa versa. As illustrated in FIG. 1F, the ferromagnetic material 22 can optionally extend from a surface 37 of the SPM assembly 20 in order to minimize the surface area over which the magnet 23 contacts the ferromagnetic material 23, thereby reducing the amount of friction encountered with regard to moving the SPM assembly 20 relative to the mounting adaptor. For example, the magnets illustrated in FIG. 1E are a plurality of nubs which extend from the surface 37 of the SPM assembly 20. Reducing friction serves to reduce the amount of energy required to move the SPM assembly 20 and objective mounting adaptor 16 relative to each other as well as reduce the amount of particles generated. A low friction material and/or low particle generating material, e.g., TEFLON, plastic, can also be used.

Figure 2A:
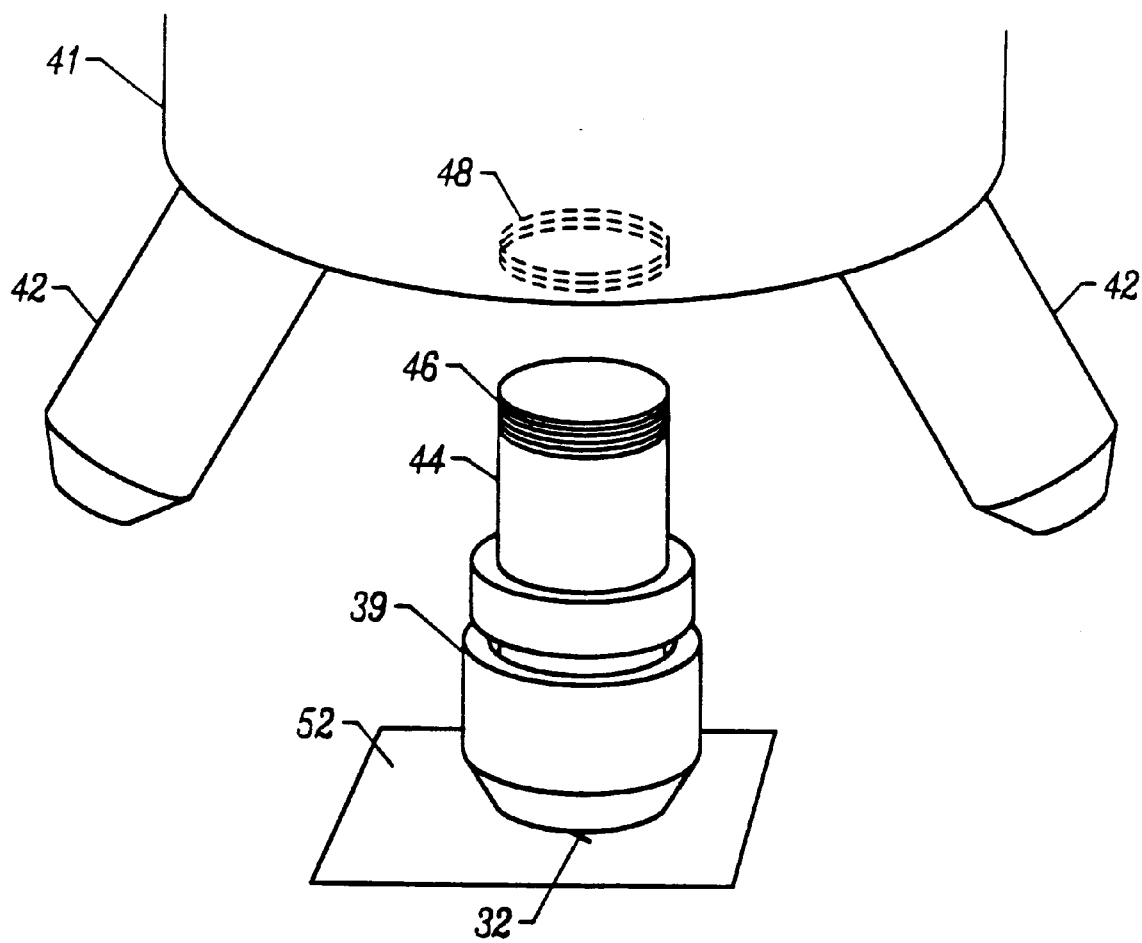
FIGS. 2A–B illustrate a SPM system incorporated onto a microscope objective which may be attached to a turret of an optical microscope.
Figure 2B:
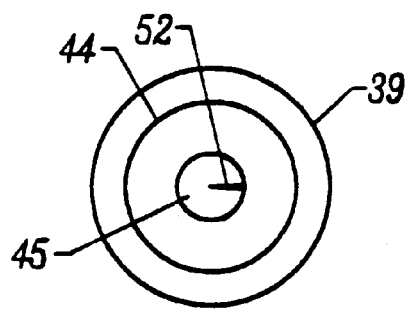

FIGS. 2A–B illustrate an alternate embodiment of the present invention in which an SPM system is incorporated onto a microscope objective which may be attached to a turret 41 of an optical microscope. FIG. 2A illustrates a breakaway depiction of this embodiment. As illustrated, an optical microscope turret 41 includes two or more stations to which microscope objectives 42 may be attached. Also illustrated is a microscope objective 44 which includes an SPM 39 with a probe 32 which extends below the objective 44 toward a sample 52. As illustrated, the microscope objective 44 includes a mechanism for attaching the objective to the turret 41, illustrated in the figure as threads 46 complementary to threads 48 on the turret 41 for screwing the objective 44 onto the turret 41. Other types of mechanisms for attaching the objective to the turret 41 which are within the skill in the art may also be used and are intended to fall within the scope of this invention.

FIG. 2B provides a top-down view of the microscope objective illustrated in FIG. 2A. As illustrated in FIG. 2B, the microscope objective and SPM are preferably designed such that the SPM does not obstruct the optical view provided by the microscope objective. As a result, optical viewing through the microscope objective is possible despite the incorporation of the SPM into the microscope objective. Minimizing the degree to which the SPM obstructs optical view provided by the microscope objective is preferred. As illustrated in FIG. 2B, the probe 32 is within the field of view provided by the microscope objective. As a result, optical viewing of an area including a range of optical imaging contrast modes can be performed simultaneously with the performance of scanning probe microscopy such as atomic force microscopy.

Figure 3A:
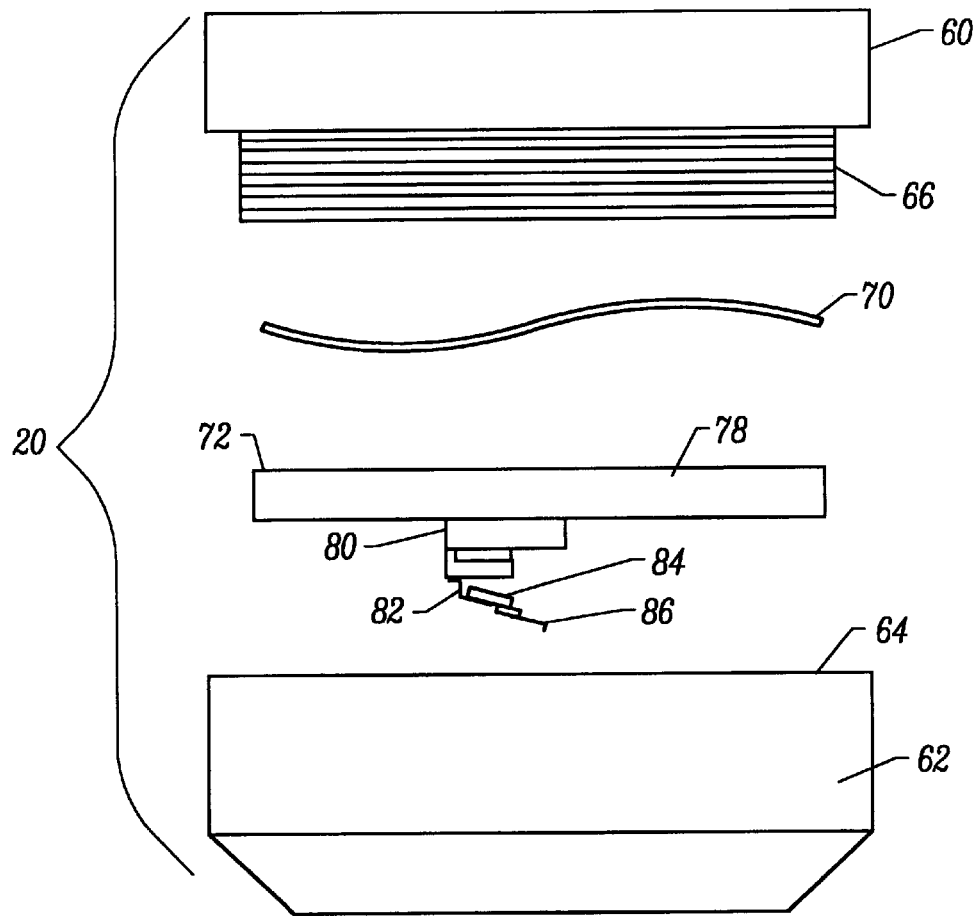
FIGS. 3A–3D illustrate embodiments of the SPM assembly described with regard to FIGS. 1A–E in greater detail.
Figure 3B:
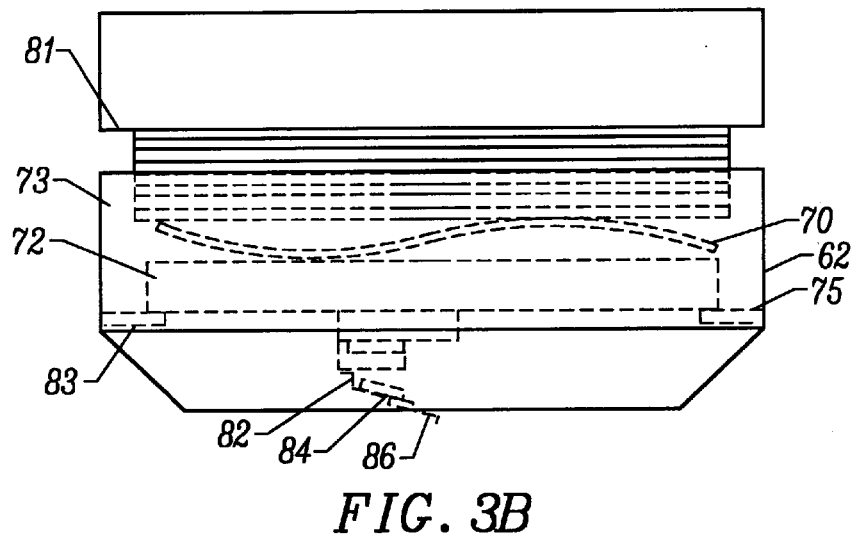

FIGS. 3A–3D illustrate embodiments of the SPM assembly 20 described with regard to FIGS. 1A–1E in greater detail. FIG. 3A provides a breakaway depiction of the SPM assembly. FIG. 3B illustrates the formed SPM assembly 20. As illustrated, the SPM assembly 20 includes a SPM mounting adaptor 60 which is designed to be releasably attachable to the objective mounting adaptor 20. For example, as illustrated in FIGS. 1A and 1E, the objective mounting adaptor 20 may include magnets 23 which attract a ferromagnetic material 22 on the SPM mounting adaptor 60.

Also illustrated is a SPM assembly end cap 62 which attaches to the SPM mounting adaptor 60. Attachment of the SPM assembly end cap 62 to the SPM mounting adaptor 60 may be accomplished using complementary threads 64,66 on the SPM assembly end cap 62 and SPM mounting adaptor 60 as illustrated in FIG. 3A. Other mechanisms for attaching the SPM assembly end cap 62 to the SPM mounting adaptor 60 which are within the skill in the art may also be used and are intended to fall within the scope of this invention.

Positioned between the SPM mounting adaptor 60 and SPM assembly end cap 62 are a spring biasing mechanism 70 and a SPM 72. As illustrated, the SPM 72 is an AFM and includes a scanning mechanism 78 for scanning a probe over a sample in the x, y and z directions, a probe support 80 attached to the scanning mechanism 78, and a probe package mounting mechanism 82 which holds a probe package containing a probe for probing the sample.

As illustrated in FIG. 3B, a space 73 exists between an inner surface 81 of the SPM mounting adaptor and an inner surface 83 of the SPM assembly end cap 62. The spring biasing mechanism 70, illustrated as a wave washer, serves to bias the SPM 72 within the SPM assembly against a rim 75 inside the SPM assembly end cap 62. It is noted that various other biasing mechanisms other than a wave washer may also be used.

The space 73 between the SPM end cap 62 and the SPM mounting adaptor 60, in combination with the biasing mechanism 70, allows the SPM 72 to be pushed upward into the SPM assembly in the event that the microscope assembly containing SPM 72 is driven into the sample surface. The end cap therefore should not be screwed onto the SPM mounting adaptor 60 so tightly that the biasing mechanism is completely compressed. Alternatively, the end cap can be designed such that the biasing mechanism cannot be completely compressed by the attachment of the end cap onto the SPM mounting adaptor 60.

By allowing the SPM 72 to move upward against the biasing mechanism 70 when the SPM 72 is driven into a sample, the biasing mechanism 70 protects the SPM 72 from being damaged due to pressure against the sample. In the event the SPM 72 is lowered too far down into the sample, the probe, a consumable element, is more likely to break than the SPM and thus relieve pressure on the SPM.

Alternatively, or in addition to the above-described biasing mechanism, the SPM can be designed such that the SPM 72 is retracted into the endcap when the SPM system and microscope objective are lowered toward the sample in order to prevent the SPM from being damaged. One possible mechanism for retracting the SPM is a solenoid connected to the disk scanner which advances and retracts the SPM relative to the endcap.

Figure 3C:
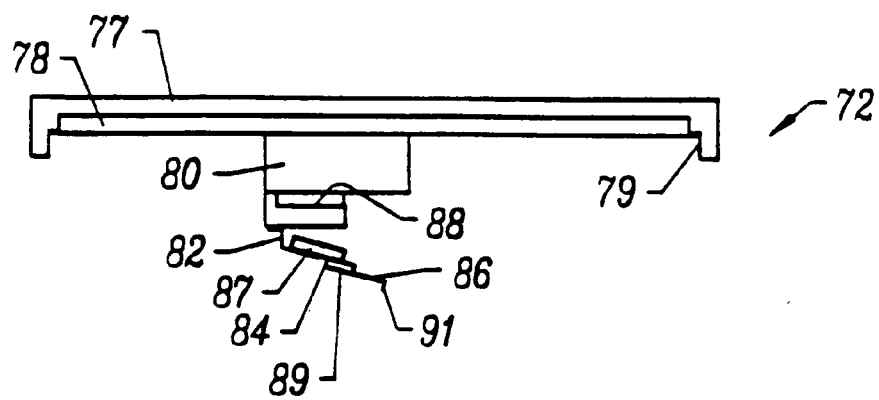

FIG. 3C illustrates an embodiment of the SPM 72 illustrated in FIG. 3A. As illustrated, the SPM 72 includes an SPM mounting cup 77 which serves as a rigid base on which the SPM is mounted. A scanning mechanism 78 is positioned within the mounting cup 77 for effecting x, y and z motion of a probe relative to a sample. A probe support 80 is attached to the scanning mechanism 78 which includes a probe package mounting mechanism 82, illustrated as a spring clip. Also illustrated is a probe package 84 mounted on the probe support 80 by the probe package mounting mechanism 82. The probe package 84, as illustrated, includes a plate 87, a probe chip 89 glued on the plate, a probe 86 projecting from the chip 89 and a probe tip 91 projecting from the probe 86. Design of a probe package is described in U.S. Pat. Nos. 5,595,942, 5,483,822 and 5,345,815 each of which are incorporated herein by reference.

Also illustrated in FIG. 3C is a cantilever oscillator 88 which is used to cause a cantilever to oscillate. The cantilever oscillator 88 may be formed of a piezoelectric material. When an alternating voltage is applied, the piezoelectric material expands and contracts, thus causing the cantilever to oscillate with the same frequency as the applied voltage. Alternating current (AC) modes of operating the AFM are therefore enabled, including intermittent contact AFM, non-contact AFM, MFM (magnetic force microscopy), FMM (force modulation microscopy), phase detection microscopy, and other AC modes of operating an scanning probe microscope (SPM).

Figure 3D:
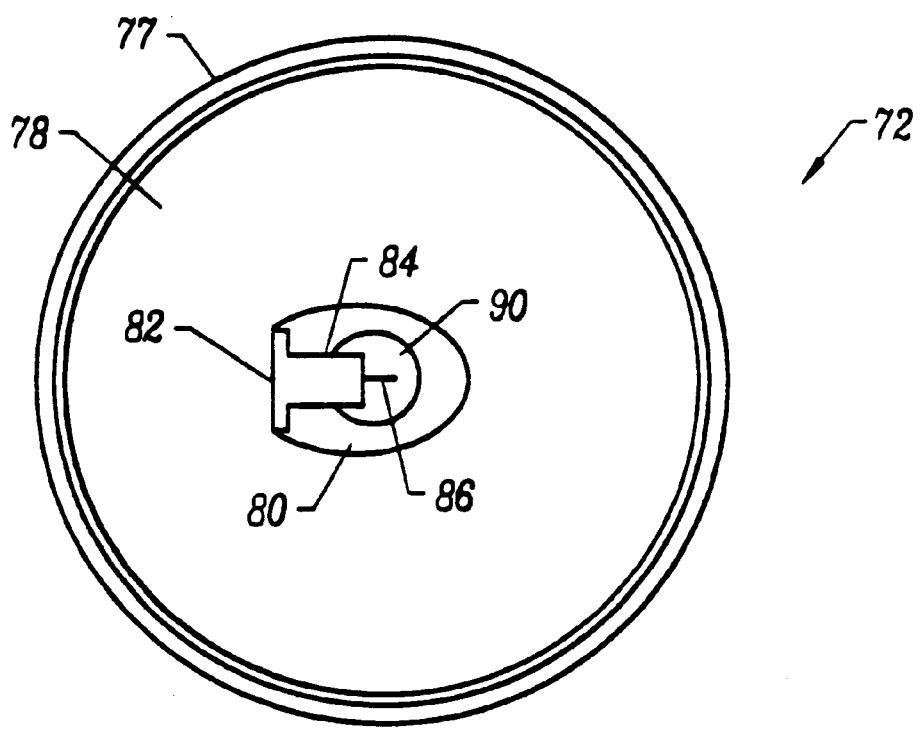

FIG. 3D illustrates a bottom up view of the SPM 72 illustrated in FIG. 3A. As illustrated, the SPM mounting cup 77, scanning mechanism 78 and probe support 80 include a hole 90 which enables an optical view to be taken through the SPM 72. As also illustrated in FIG. 3D, the probe 86 is preferably positioned within the area defined by the hole 90 such that the probe 86 is within the field of view provided to the microscope objective through the SPM 72.

As illustrated in FIGS. 3C–3D, the scanning mechanism 78 is mounted on the inside of a mounting cup 77, for example by glue or epoxy, which serves to fix the outer edge of the scanning mechanism 78 relative to a movable or flexible center portion of the scanning mechanism. The mounting cup is preferably made of an insulating material such as anodized aluminum, so that it is isolated electrically from the scanning mechanism. The mounting cup 77 preferably includes a hole 90 in the center, as illustrated, for optical viewing.

As also illustrated in FIGS. 3C–3D, the mounting cup 77 has an inner ridge 79 formed around the inside of the lip of the mounting cup 77. The inner ridge 79 serves as a spacer to provide room for the scanning mechanism as it flexes in response to applied voltages. The inner ridge 79 may be integrally formed with the mounting cup 77 or be glued to the inside of the mounting cup.

In a preferred embodiment, the scanning mechanism 78 is a disk scanner. Most commercial SPMs use tripod scanners or tube scanners. By contrast, disk scanners are compact and provide a larger field of view for scanning for a given width (depth) of the scanner and also a much larger z range of motion.

Figure 4A:
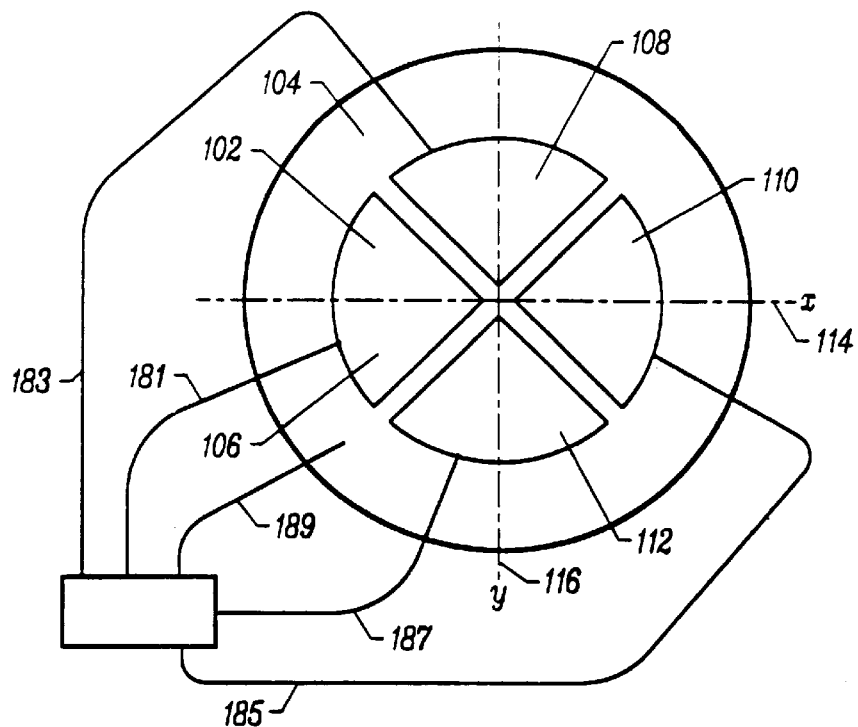
FIG. 4A illustrates a disk scanner.

As illustrated in FIG. 4A, the disk scanner may consist of a circular flat piezoelectric layer 102 attached to a thin metal disk 104, such as an approximately 15 mils thick stainless steel disk. Disk scanners are inexpensive, mass produced and readily available. Disk scanners are currently used in a range of variety of products including door bell ringers, speakers, pressure sensors and force sensors. Disk scanners are also easy to design with custom electrode patterns, dimensions and with holes at about the center, the importance of which will be shown by embodiments described herein.

As illustrated in FIG. 4A, the disk scanner 78 is divided into four quadrants 106, 108, 110, 112 defined by four conducting electrodes attached to the piezoelectric layer 102. Each of the four quadrants is centered about either an x or y axis 114, 116. When a voltage is applied to an electrode, the corresponding quadrant of the piezoelectric element expands or contracts laterally relative to the underlying metal layer 104, causing the disk scanner to bend. This bending motion produces tilting of a probe holder mounted on the disk scanner. As a result, the probe holder can be moved in an arc-like motion in the x and y directions by applying appropriate voltages to one or more of the four quadrants. The probe holder can also be moved in the z direction by applying voltage to one or more of the four quadrants. Approximately linear motion in the z direction can be accomplished by applying the same voltage to each quadrant.

Figure 4B:
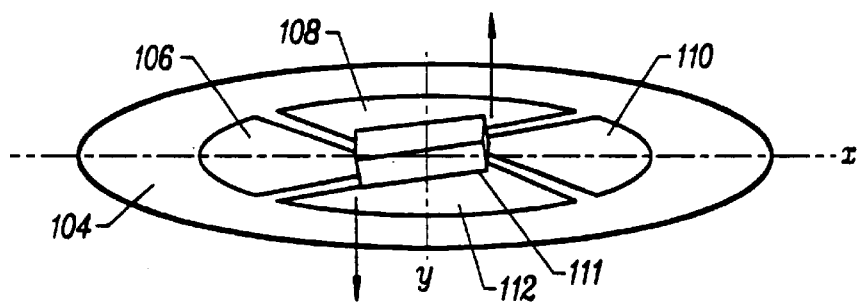
FIG. 4B illustrates lateral scanner movement.
Figure 4D:
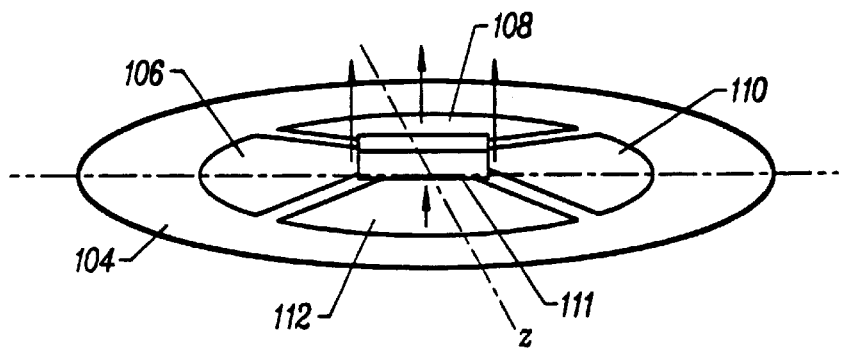
FIG. 4D illustrates scanning movement in the z direction.
Figure 4C:
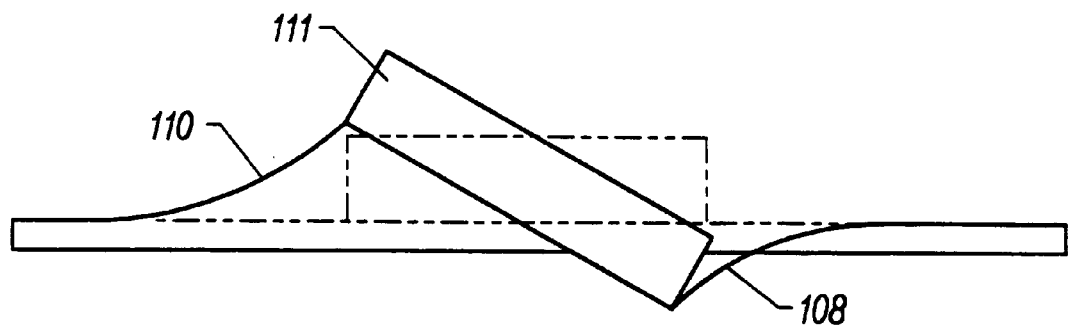
FIG. 4C illustrates a cross-sectional view of the lateral scanner movement illustrated in FIG. 4B.

As illustrated in FIGS. 4B–4C, when voltages of opposite polarity are applied to diagonally opposing electrodes, one quadrant 106 of the piezoelectric layer 104 contracts while the opposite quadrant 110 of the piezoelectric layer expands. This lateral expansion/contraction of the piezoelectric layer causes the underlying metal layer to flex, with one quadrant bowing upwards and the other bowing downwards. Bowing of the piezoelectric layer in the different quadrants produces angular motion of a probe support 111 attached to the scanning mechanism along the axis transecting the two opposing quadrants (illustrated in the figure as the x axis). By applying voltages to the quadrants 108, 112, movement along the axis transecting quadrants 108, 112 (illustrated in the figure as the y axis) can be achieved. Similarly, by applying voltages to the quadrants 106, 110, movement along the axis transecting quadrants 106, 110 (illustrated in the figure as the x axis) can be achieved.

At least five contact wires are connected to the disk scanner, as illustrated in FIG. 4A. Four wires 181, 183, 185, 187 are connected one each to the four conducting electrodes 106, 108, 110, 112 for producing x and y motion of the probe, and one wire 189 is connected to the metal layer 104 for producing z motion by causing the piezoelectric layer in all four quadrants to bow up and down in its fundamental bending mode. Alternatively, voltage can be applied to all four quadrants for producing x, y and z motion with a DC voltage applied to the metal layer to provide a bias difference across the electrodes.

Disk scanners, such as the one illustrated in FIGS. 4A–4B produce an arc-like motion of a probe in the x and y directions and vertical motion in the z direction, similar to that produced by a tube scanner. In one embodiment, the disk scanner provides a vertical scan range of about 40 μm in z and a lateral scan range of about 60 μm in x and y. A taller probe holder increases the lateral scan range, or throw, for a given angular motion. Scan ranges on the order of hundreds of microns to several millimeters are possible with different probe holder heights.

The z range of motion, or z throw, is a significant advantage over the more conventional tube scanners used in commercial SPMs. The z throw is also much longer than for other types of scanners of comparable thickness (depth), for instance tripod scanners.

The bowing motion of the probe produced by the disk scanner results in curvature superimposed on topography in an image. However, in a central, approximately 10 µm diameter field of view, the disk scanner of this invention actually exhibits fewer imaging artifacts of this nature than are seen using tube scanners. A software correction method which performs a quadratic fit or a fit using another mathematical function to the image data and then subtracts the resulting background curvature can satisfactorily remove this artifact from an SPM image.

Figure 4E:
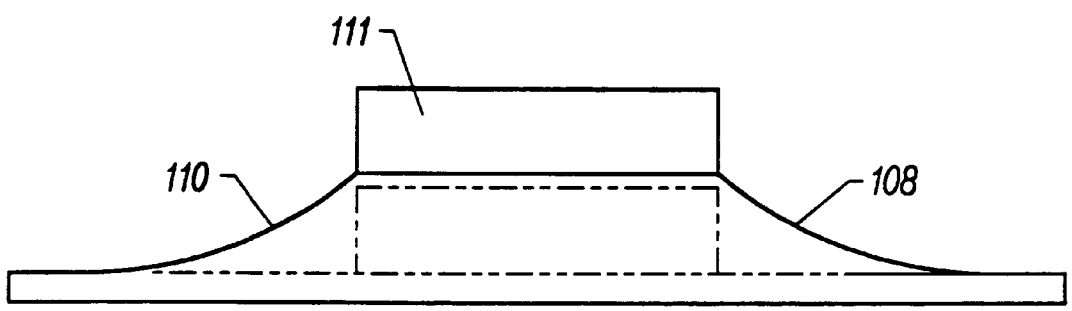
FIG. 4E illustrates a cross-section view of FIG. 4D.

As illustrated in FIGS. 4D–4E, movement in the z direction can be achieved by applying the same polarity of voltage to all four quadrants to cause the piezoelectric layer in the four quadrants to bow in the same direction, thereby causing movement upward or downward.

Figure 5:
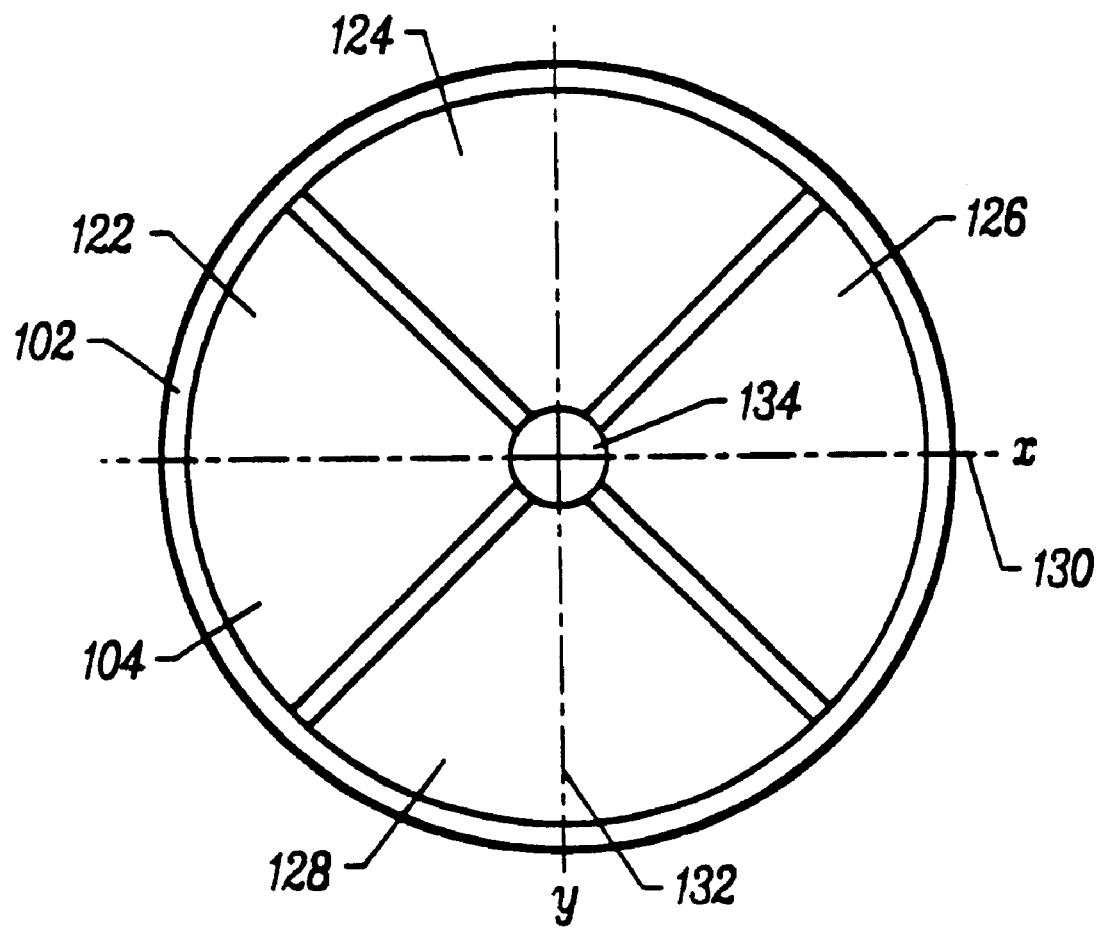
FIG. 5 illustrates a disk scanner.

In one embodiment, the disk scanner includes a hole in its center which allows an unobstructed optical view of the probe and sample through the SPM. As illustrated in FIG. 5, the disk scanner 120 includes a flat piezoelectric layer 102 attached to a metal layer 104. The disk scanner is divided into four quadrants 122, 124, 126, 128 defined by four conducting electrodes attached to the piezoelectric layer 102. These conducting electrodes may be attached to the piezoelectric layer 102 by a variety of mechanisms including gluing or painting the electrodes onto the piezoelectric layer 102.

The quadrants are transected by the x and y axes 130, 132. Positioned at about the center of the scanning mechanism is a hole 134 through which an optical view of the sample and probe is provided. By mounting a probe on the disk scanner such that the probe is within the lateral area defined by the hole, the probe is within the optical field of view of the sample and can be simultaneously observed with the sample. The optical view provided by the hole in the disk scanner may be used to facilitate the selection of a region on the sample surface for imaging and alignment of the probe position over the sample.

Figure 6:
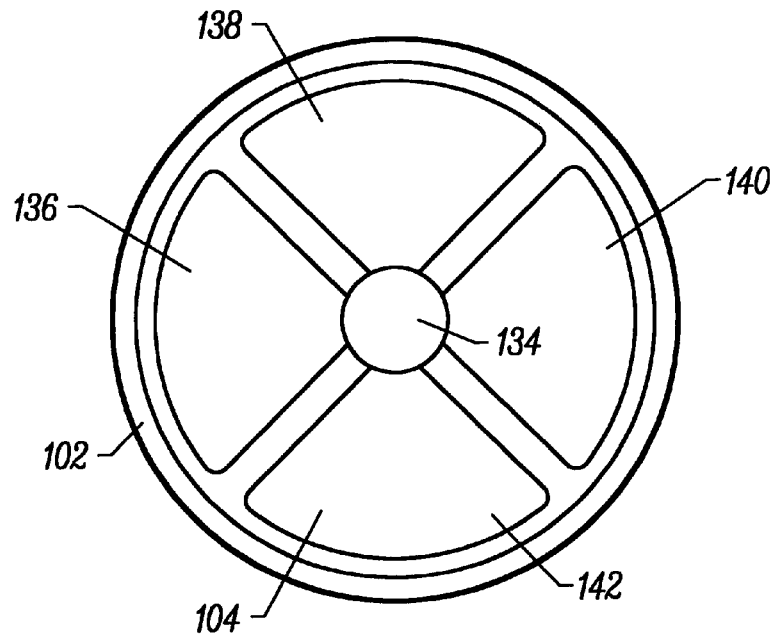
FIG. 6 illustrates a disk scanner with independent piezoelectric elements.

Several configurations for forming the quadrants on the disk scanner can be used to amplify the bending motion and/or reduce coupling between motion in the x and y directions. As illustrated with regard to FIGS. 4A–4E, a single piezoelectric element 102 can be used in combination with a single metal layer 104. Alternatively, as illustrated in FIG. 6, multiple piezoelectric elements 136, 138, 140, 142 can be attached to the metal layer 104. The multiple piezoelectric elements 136, 138, 140, 142 can be formed by attaching a single piezoelectric element to the metal layer 104 and then cutting or scraping the piezoelectric element into multiple elements. The cuts or scraps can be formed, for instance, by scratching two intersecting lines at 90° relative to each other in the conducting paint and the piezoelectric layer to expose the stainless steel disk underneath. By forming four quadrants which are not connected by piezoelectric material, coupling between the x and y bending motion is reduced.

Figure 7:
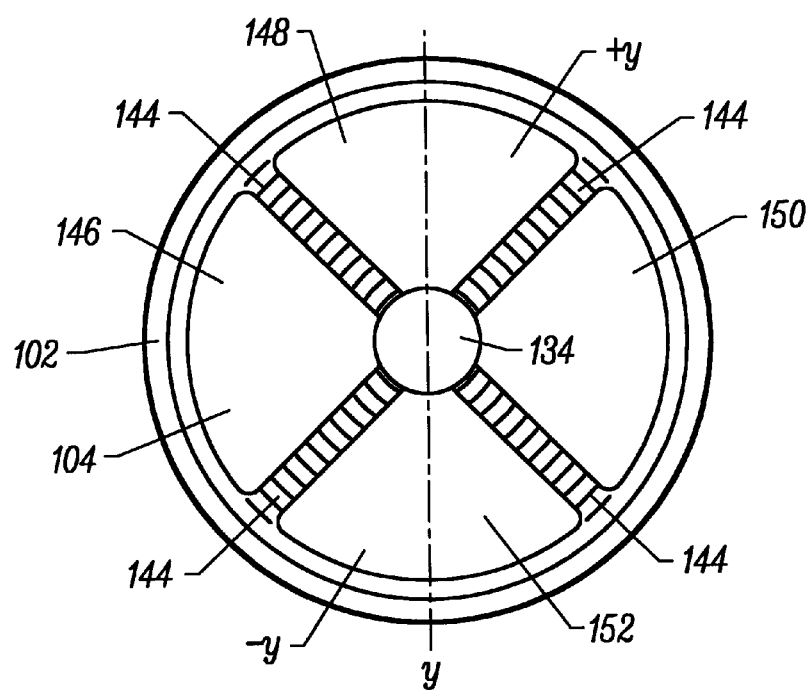
FIG. 7 illustrates a disk scanner with slots formed in the piezoelectric element.

In another embodiment, illustrated in FIG. 7, slots or holes 144 can be formed in the piezoelectric layer 102 and the underlying metal disk 104 aligned along the quadrant boundaries. The slots serve to weaken the mechanical coupling between the quadrants, reducing x and y cross-coupling and allowing the assembly to produce more x and y bending motion. Since the mechanical support structure is weakened, less force is needed to produce bending in one pair of opposing quadrants, for instance quadrants 148 and 152.

Figure 8A:
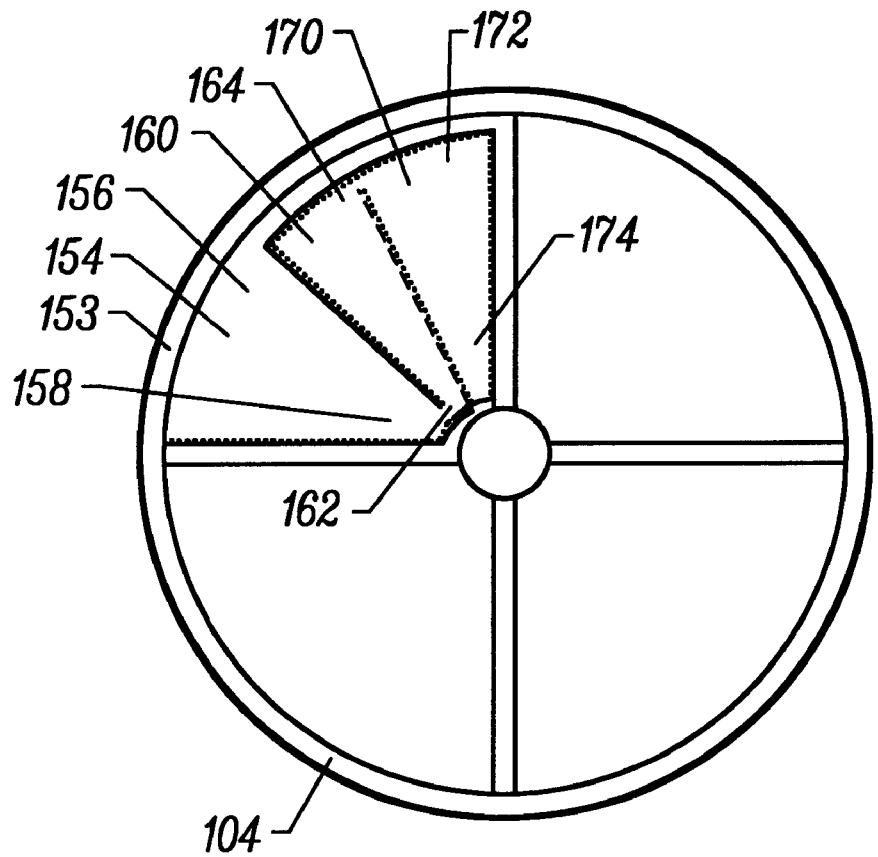
FIG. 8A illustrates a disk scanner with amplified bowing.

In another embodiment, a disk scanner is provided having amplified bending motion relative to a configuration as illustrated in FIG. 7 for a given applied voltage. As illustrated in FIG. 8A, each quadrant comprises a piezoelectric element which has been divided or cut into a first section 154 with a first end 156 attached to the fixed outer edge of the metal disk 104 and a second end 158. The quadrant also includes a second section 160 with a first end 162 attached to the first section 154 and a second end 164. The quadrant also includes a third section 170 with a first end 172 attached to the first section 160 and a second end 174 which can be attached to a mounting surface for a probe holder.

Figure 8B:
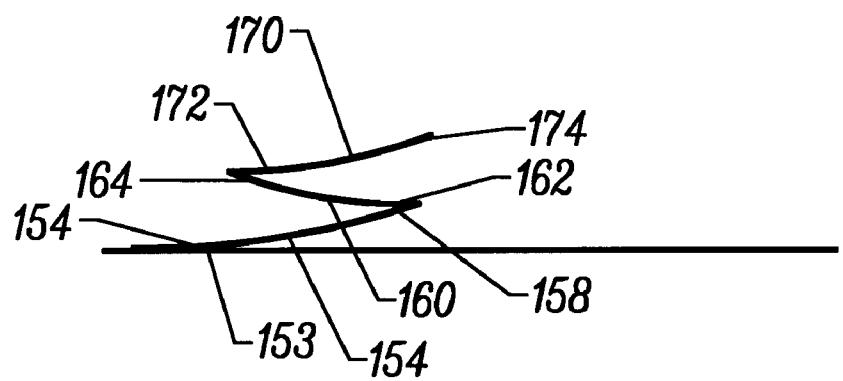
FIG. 8B illustrates a lateral view of a quadrant of the disk scanner illustrated in FIG. 8A.

As illustrated in FIG. 8B, applying a voltage to a quadrant causes the second end 158 of the first section 154 to bend relative to the first end 156 which is attached to the fixed outer edge of the metal disk 104. Meanwhile, the voltage also causes the second end 164 of the second section 160 to bend relative to the first end 162 of the second section 160 and hence relative to the first section 154. In addition, the second end 174 of the third section 170 bends relative to the second section 160. As a result, as illustrated in FIG. 8B, the total displacement that is possible for the center of the disk scanner relative to the fixed outer edge is amplified roughly in proportion to the number of sections.

With regard to any of the above-described configurations for a disk scanner, quadrants can be optionally formed on both sides of the scanner to enable quadrants on opposite sides of the scanner to expand or contract so as to create enhanced scanner bending motion relative to a scanner with quadrants or a single side.

In another alternative embodiment, a bimorph piezoelectric element consisting of two different piezoelectric layers glued together is used as the scanning mechanism. A bimorph scanner allows for greater flexing than a disk scanner, since one layer can expand while the other contracts. A bimorph scanner is easy to manufacture since it is easy to make cuts in a piezoelectric bimorph. For instance, a sandblaster or laser can be used to cut through the ceramic.

In another embodiment, a voice coil scanner is used as the scanning mechanism. Voice coils have lower noise electronics than piezoelectric tube scanners and can easily produce a much larger scan range. Use of a voice coil have the advantage of allowing a very short working distance system. For example, it is possible to position the voice coil mechanism around the objective such that the minimum working distance that may be used is reduced.

The probe support 80 is attached to the scanning mechanism and is translated by the scanning mechanism. In a preferred embodiment, the probe support 80 is in the form of a ring, as illustrated in FIG. 3D with a hole 90 which enables simultaneous optical viewing of the probe and sample. The probe support 80 is secured to the scanning mechanism over the ring's entire inner edge, for example using glue or epoxy, so that the scanning mechanism 78 fully transmits motion of the center portion of the scanning mechanism 78 to the probe support 80.

The probe support 80 also acts as a spacer which increases the distance between the tip of the probe 86 and the scanning mechanism 78. It thus amplifies lateral displacement of the probe 86 for a given angular motion of the probe support 80 and also ensures that one side of the probe package mount 82 is not pulled back into the end cap of the microscope assembly as the scanning mechanism 78 bends up and down. The probe support 80 should be made of a light material, in order to provide a high resonant frequency for bending modes of the scanning mechanism. High resonant frequencies enable higher scanning speeds of the probe over the sample. The probe support 80 should also be made of an insulating material, to electrically isolate the probe package 84 from the scanning mechanism 78. In a preferred embodiment, a plastic support ring is used as the probe support 78. Other types of insulating materials, such as a ceramic, can also be used.

In one embodiment, the probe support 80 is a ring which includes a hole with a diameter which matches the hole diameter of the disk scanner and mounting cup. The diameter should be chosen such that the optical path between the objective lens and the probe is unobstructed so that the effective numerical aperture of the objective lens is not reduced. Larger numerical apertures are preferable, and therefore wider support rings (and thus holes in the disk scanner) are desirable so as not to reduce the resolving power of the optical view.

Figure 9:
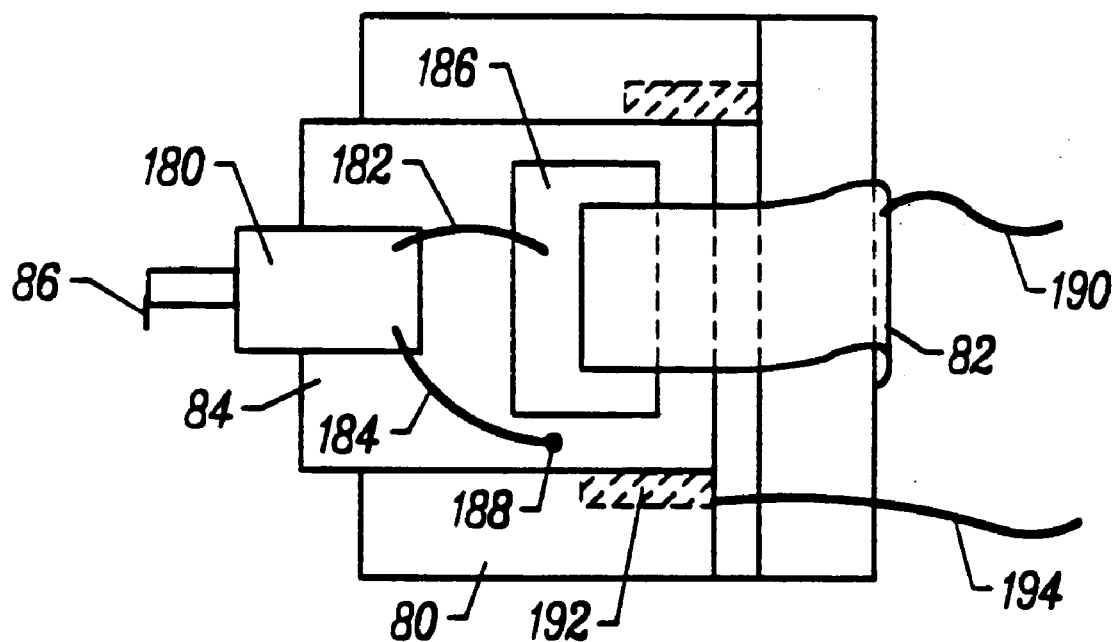
FIG. 9 illustrates a preferred embodiment of a probe support and a probe package mounting mechanism for attaching a piezoresistive cantilever package.

FIG. 9 illustrates a preferred embodiment of a probe support 80 and a probe package mounting mechanism 82 for attaching a piezoresistive cantilever package. As illustrated, the probe support 80 includes a probe package mount 82 illustrated as a spring clip which attaches a probe package 84 to the probe support 80. It should be noted that although the probe package mounting mechanism 82 is illustrated with regard to a spring clip, other mechanisms for attaching the probe package to the probe support may be used also and are within the skill in the art.

Also illustrated in FIG. 9 are the electrical contacts for the probe support 80 and probe package 84. As illustrated, the probe package includes a probe 86 which extends from a piezoresistive cantilever 180 which projects from a probe chip. Two electrical contact wires 182, 184 are attached to the piezoresistive cantilever 180. A first electrical contact wire 182 is attached to a first contact pad 186 on the top of the probe package 84 while the second electrical contact wire 184 passes through a hole 188 in the probe package 84 to a second contact pad (not shown) on the underside of the probe package 84. The first contact pad 186 makes electrical contact with the spring clip 82 which has a wire 190 connected to it. The second contact pad makes electrical contact with a contact pad 192 on the probe support 80 which has a wire 194 connected to it. Using a wheatstone bridge, resistance is measured along the electrical path from wire 190 to wire 194 in order to measure the deflection of the piezoresistive cantilever.

Figure 10A:
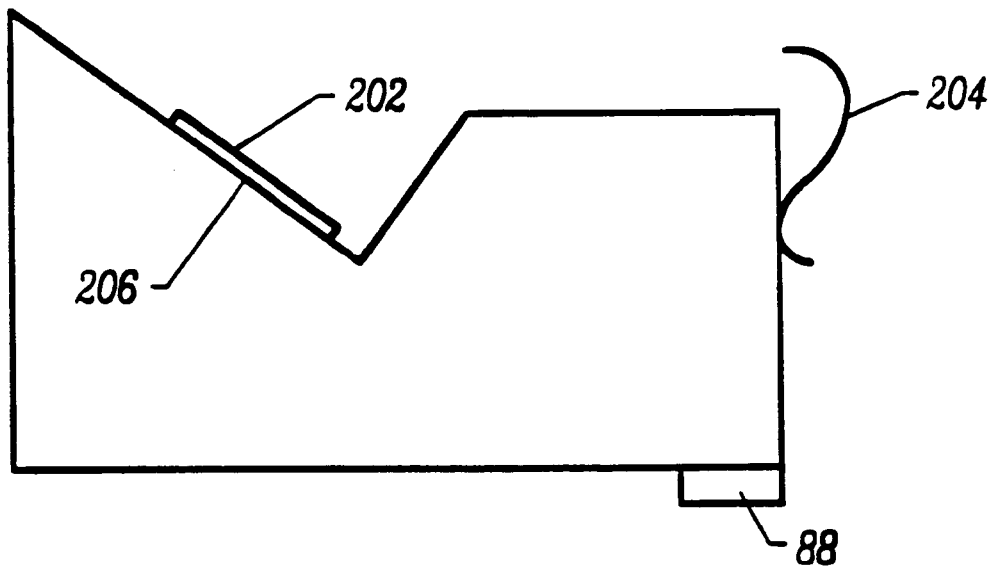
FIG. 10A illustrates an embodiment of a probe package mount.
Figure 10B:
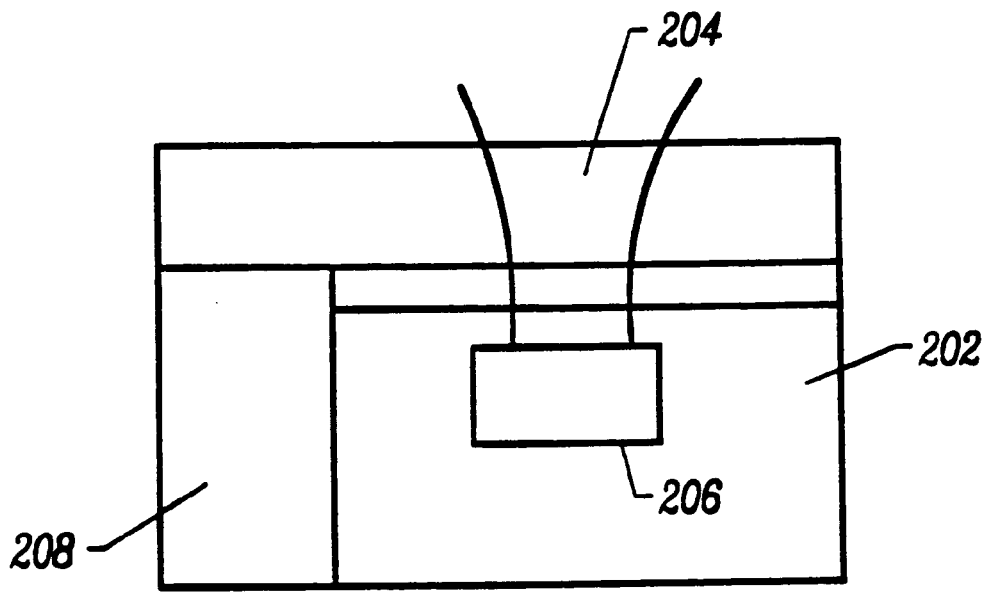
FIG. 10B illustrates a probe package mount with a raised edge for aligning the probe package on the probe holder.

The probe support 80 is made of an insulating material. In a preferred embodiment, the probe support 80 is made of macor, a machinable ceramic. Other insulating materials can also be used to construct the probe support. As illustrated in FIG. 10A, the probe support 80 preferably includes a V-shaped groove 202 in its top surface which serves to orient the probe at an angle of roughly 15° relative to a horizontal plane which is defined by a flat sample. A pre-mounted probe package (not shown) can be positioned in the V-shaped groove 202 and secured to the mount using a spring clip 204. The top surface of the groove 202 is covered with a conducting material 206 such as conducting paint or epoxy. As illustrated in FIG. 10B, the probe support 80 can also include a raised edge 208 which can be used to align the probe package on the probe holder.

The present invention also relates to the use of voice coil scanners and disk scanners generally in scanning probe microscopes.

In one embodiment, a voice coil scanner is provided for use in a scanning probe microscope which includes a fixed, stationary portion and a moveable portion, the moveable portion being attached to the fixed portion by one or more springs. The scanner further includes one or more voice coils attached to either the fixed or moveable portion for moving the moveable portion relative to the fixed portion against tension provided by the one or more springs.

FIGS. 11–13 illustrate a series of embodiments of voice coil scanners which may be used in scanning probe microscopes according to the present invention.

Figure 11A:
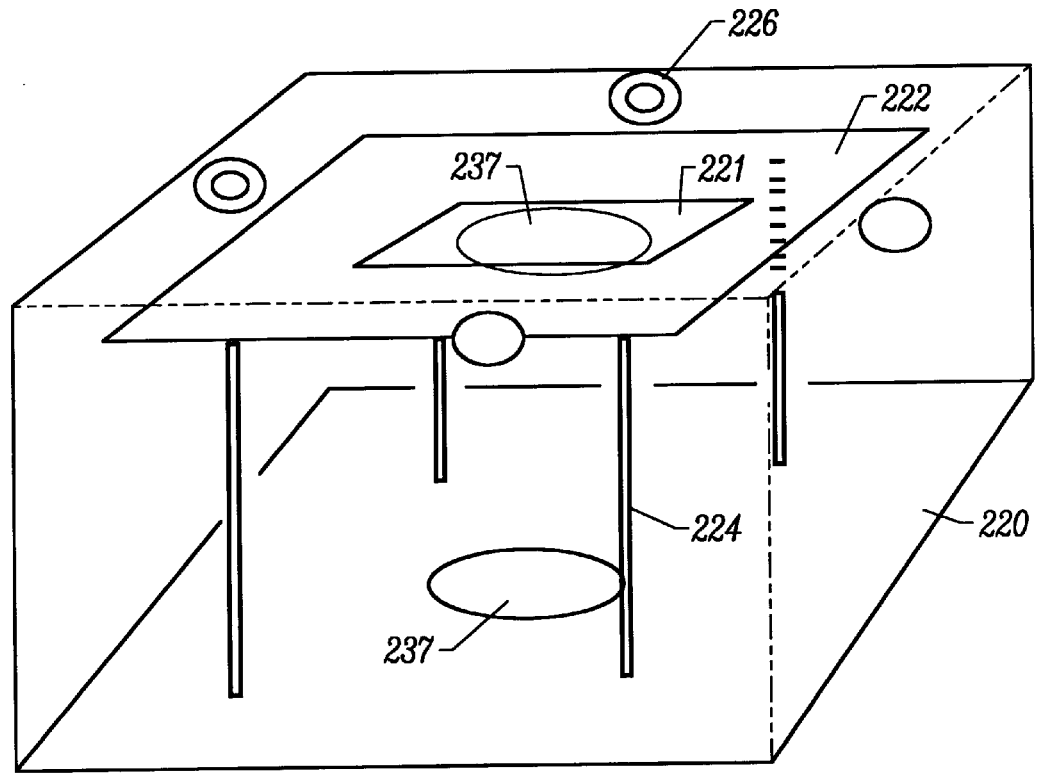
FIG. 11A illustrates a side view of a scanning mechanism for use as an SPM scanning stage in which a voice coil scanner is used to provide scanning motion in the x and y directions.
Figure 11B:
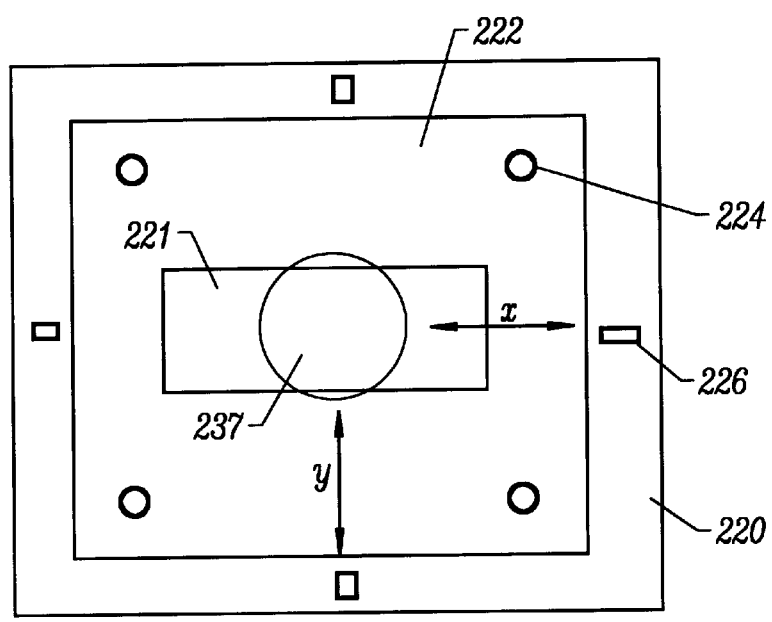
FIGS. 11B illustrates a top down view of a scanning mechanism for use as an SPM scanning stage in which a voice coil scanner is used to provide scanning motion in the x and y directions.

FIGS. 11A and 11B illustrate a side and top down view respectively of a scanning mechanism for use as an SPM scanning stage in which a voice coil scanner is used to provide scanning motion in the x and y directions for a sample 221 attached to the stage, shown as a glass slide. As illustrated, the scanning mechanism comprises a fixed, stationary portion 220 and a moveable portion 222. The moveable portion 222 is attached to the fixed portion 220 by four springs 224, shown in this case to be rigid wires. The four springs are oriented such that they are translatable in the x and y directions but are substantially rigid in the z direction. Four voice coils 226 are attached to the fixed portion 220 such that they can translate the moveable portion 222 in the x and y directions It is noted that the voice coils 226 may be attached to the moveable portion 222 instead of the fixed portion 220.

The four springs preferably have a linear spring constant over the distance which the end of the spring attached to the moveable portion is translated. This distance may be at least 5 mm, preferably at least 10 mm and more preferably at least 30 mm.

The four voice coils are preferably driven by a current source. It has been observed that the use of a current source as opposed to a voltage source to drive the voice coils results in improved linearity of scanning motion because the force between the magnet and coil is directly proportional to the current flowing through the coil. A voltage source may also be used but may have thermal drift problems and inductive load problems.

Figure 11C:
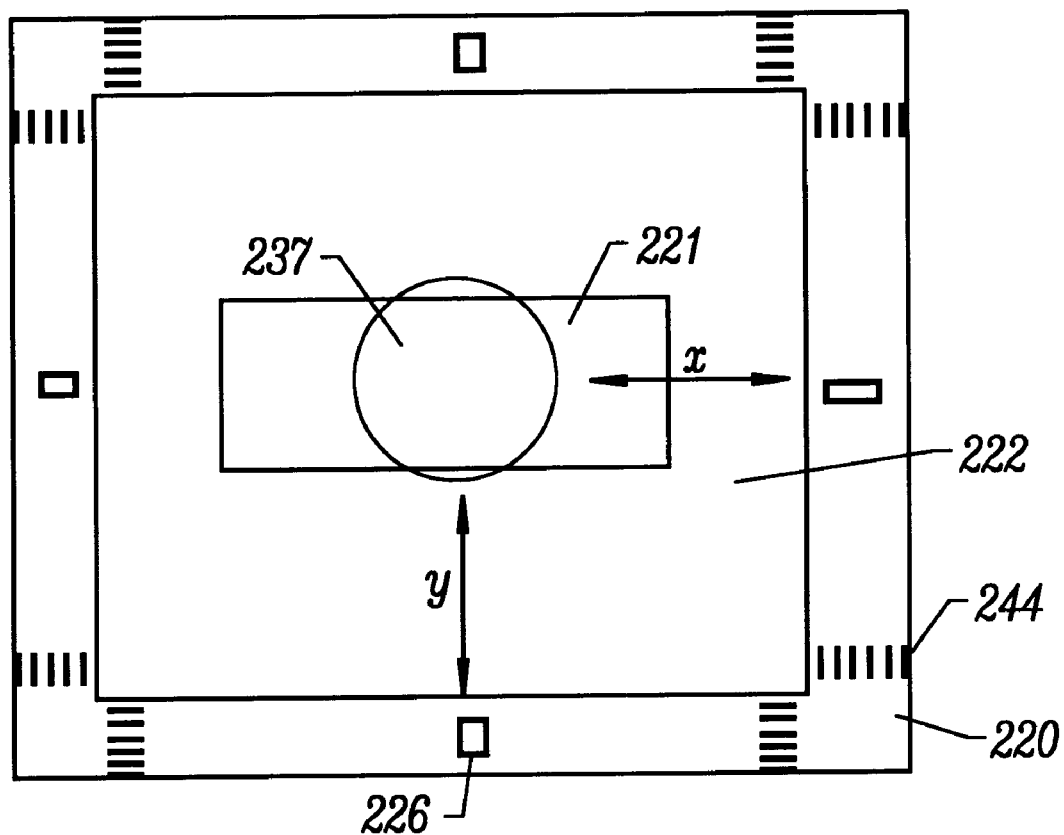
FIGS. 11C illustrates an embodiment where the voice coil scanner is employed in a scannable sample stage and the springs are not rigid in the z direction.

FIGS. 11C illustrates an alternative embodiment where the voice coil scanner is employed in a scannable sample stage. In this embodiment, the springs 244 are attached in a manner where the springs are not rigid in the z direction. An example of a non-rigid spring is a coil spring.

Figure 12A:
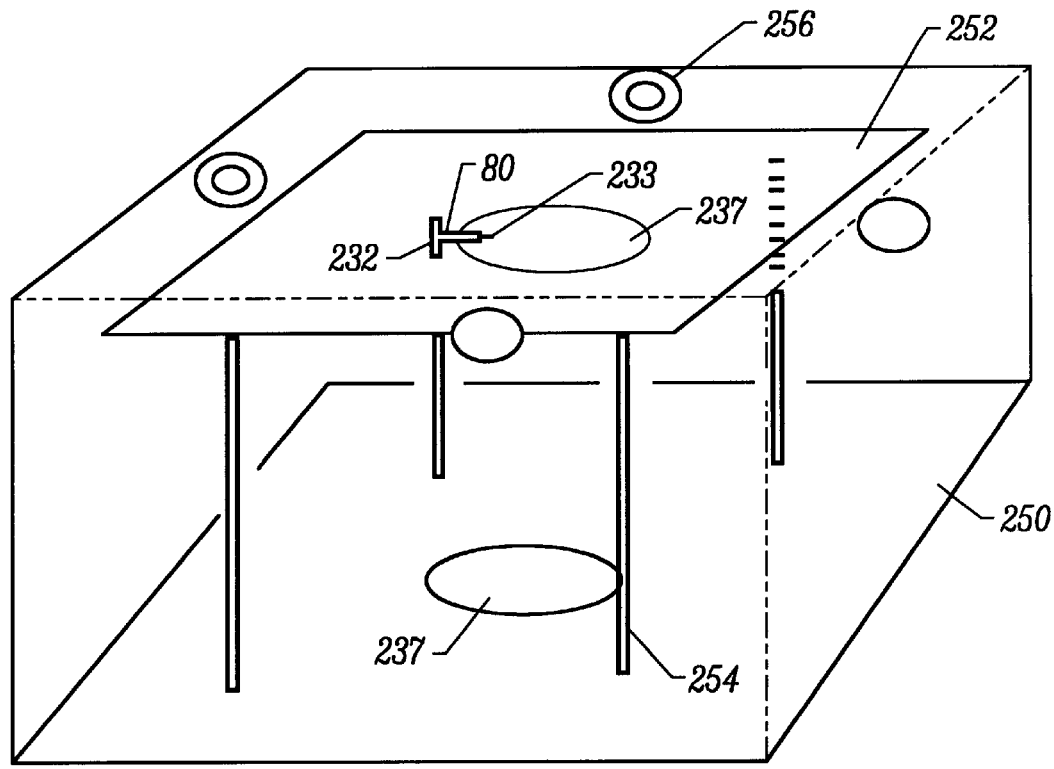
FIG. 12A illustrates a side view of a scanning mechanism for use as an SPM head in which a voice coil scanner is used to provide scanning motion in the x and y directions.
Figure 12B:
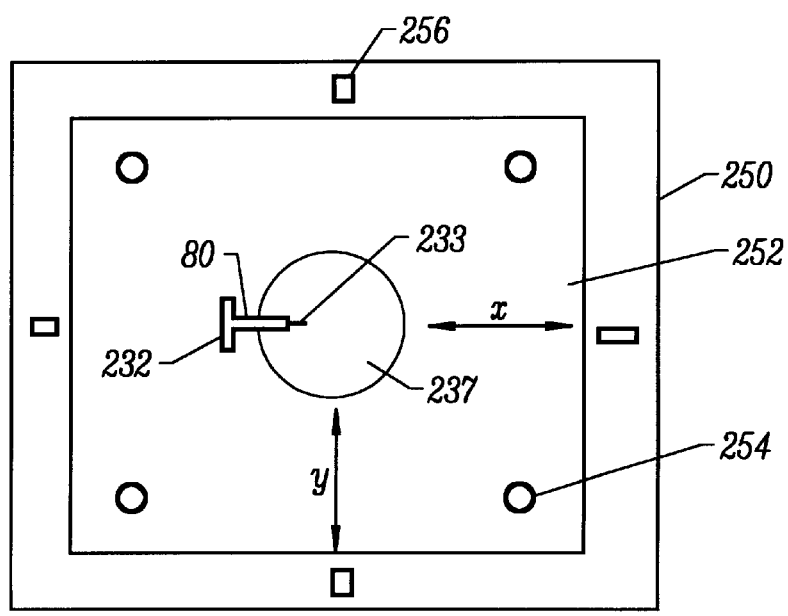
FIGS. 12B illustrates a top down view of a scanning mechanism for use as an SPM head in which a voice coil scanner is used to provide scanning motion in the x and y directions.

FIGS. 12A–B illustrate embodiments where a voice coil scanner is employed in a scanning microscope head in order to scan a probe relative to a sample. As illustrated in the figures, the scanning microscope head includes a fixed, stationary portion 250 and a moveable portion 252 onto which a probe 260 may be attached. The fixed 250 and moveable portions 252 are attached to each other by a series of springs 254. The series of springs 254 are preferably translatable in the x-y direction but are substantially rigid in the Z direction. This serves to minimize a trampolining effect of the moveable portion which can be observed in the z direction when the springs are not rigid in the z direction. As illustrated in FIGS. 12A and 12B respectively, voice coils 256 may be attached to either the fixed 250 or moveable 252 portions of the microscope head.

As also illustrated in FIGS. 12A and 12B, a probe support 230 is attached to the moveable portion 222. A probe package mounting mechanism 232 is attached to a probe support 80 for holding a probe 233 package containing a probe for probing the sample.

Figure 12C:
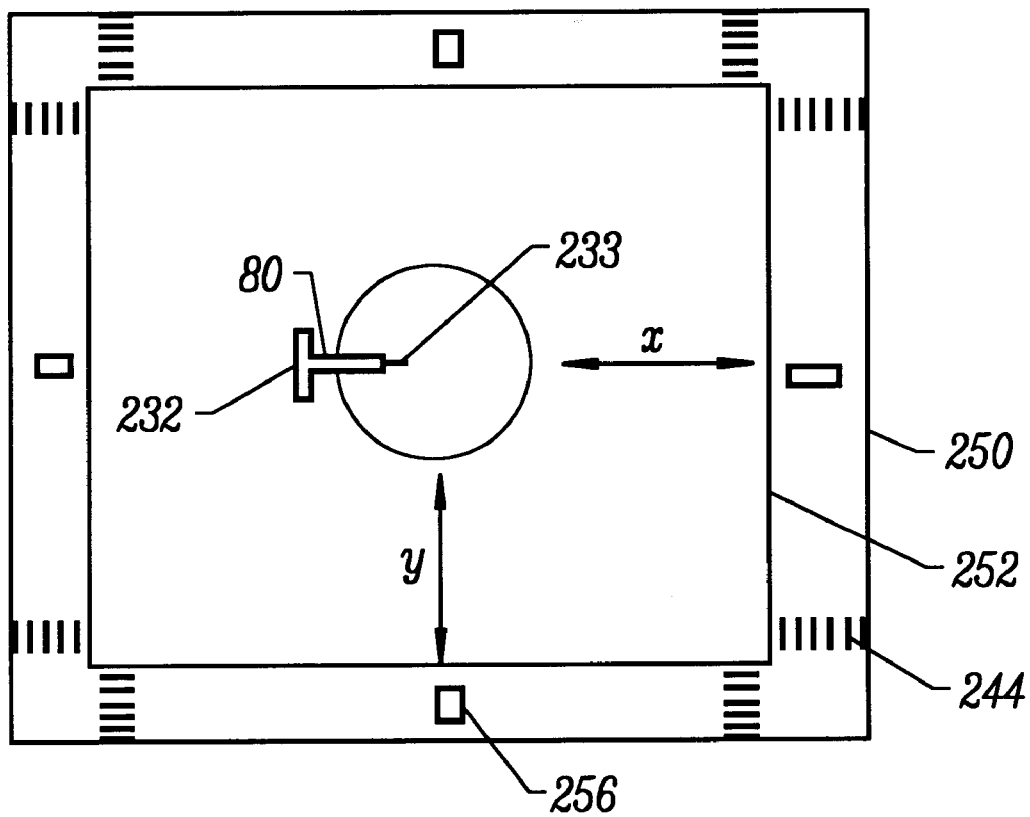
FIGS. 12C illustrates an embodiment where the voice coil scanner is employed in a scannable sample stage and the springs are not rigid in the z direction.

FIGS. 12C illustrates an alternative embodiment where the voice coil scanner is employed in a scannable sample stage. In this embodiment, the springs 244 are attached in a manner where the springs are not rigid in the z direction. An example of a non-rigid spring is a coil spring.

As illustrated in FIGS. 11–12, a hole 237 can be provided through either the stage (element 245 in FIGS. 11A–C) or the scanning probe microscope head (element 255 in FIGS. 12A–C) so that an optical view of the sample is provided through the voice coil scanner.

Figure 13A:
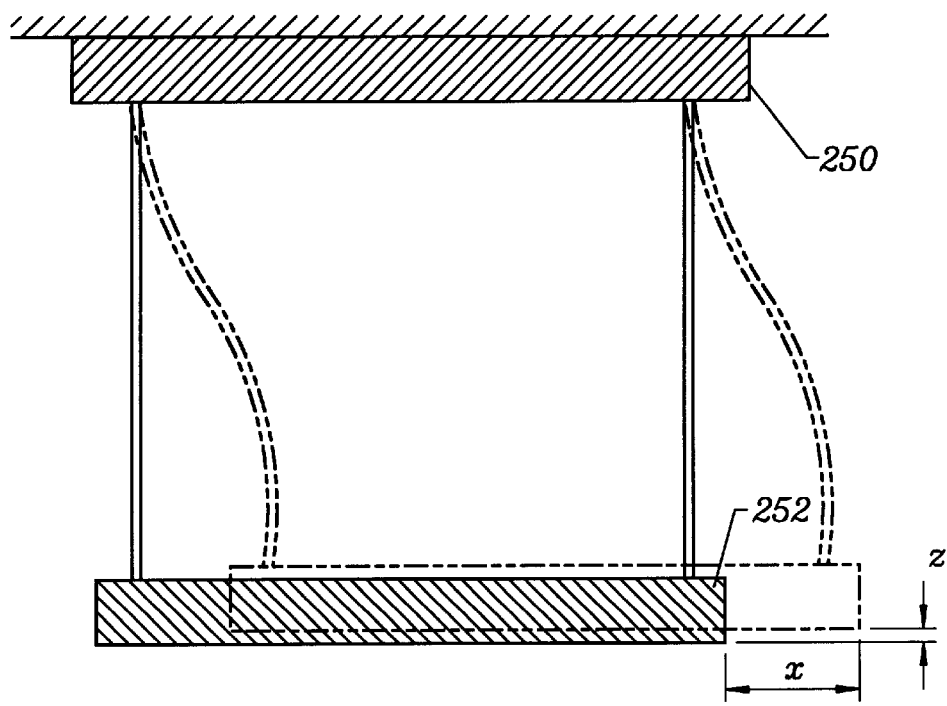
FIG. 13A illustrates bowing in the z direction of a voice coil scanner when translated in the x or y direction.
Figure 13B:
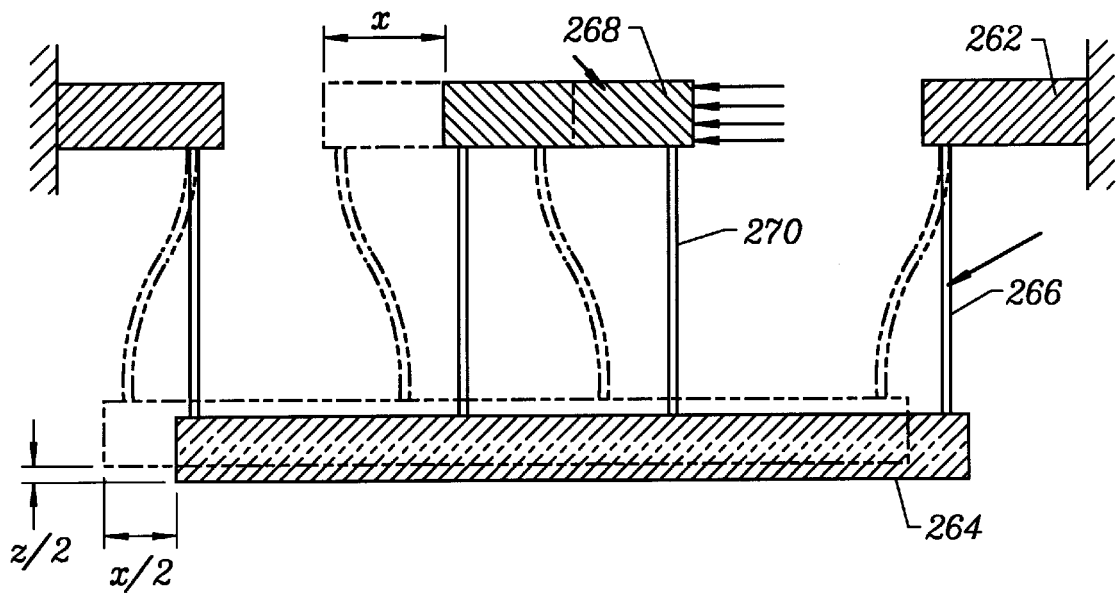
FIG. 13B illustrates an embodiment of a voice coil scanner where bowing in the z direction is reduced when the scanner is translated in the x or y direction.

Translation of the voice coil scanner in the x or y direction, as illustrated in FIG. 13A, causes the scanner to move or bow in the z direction. FIG. 13A illustrates an embodiment of a voice coil scanner which may be used in any of the embodiments described above where movement or bowing in the z direction is substantially reduced, if not eliminated. As illustrated, in FIG. 13B, the stage includes a fixed portion 262 to which is attached a first moveable portion 264 by first spring members 266. A second moveable portion 268 is attached to the first moveable portion 264 by second spring members 270. As illustrated, the bowing of the first spring members compensates for the bowing of the second spring members. As a result, the second moveable portion 268 does not bow in the z direction. Translation of the second moveable portion 268 is achieved by voice coils which may be attached to either the fixed portion 262 as shown or the second moveable portion 268 (not shown).

Figure 14A:
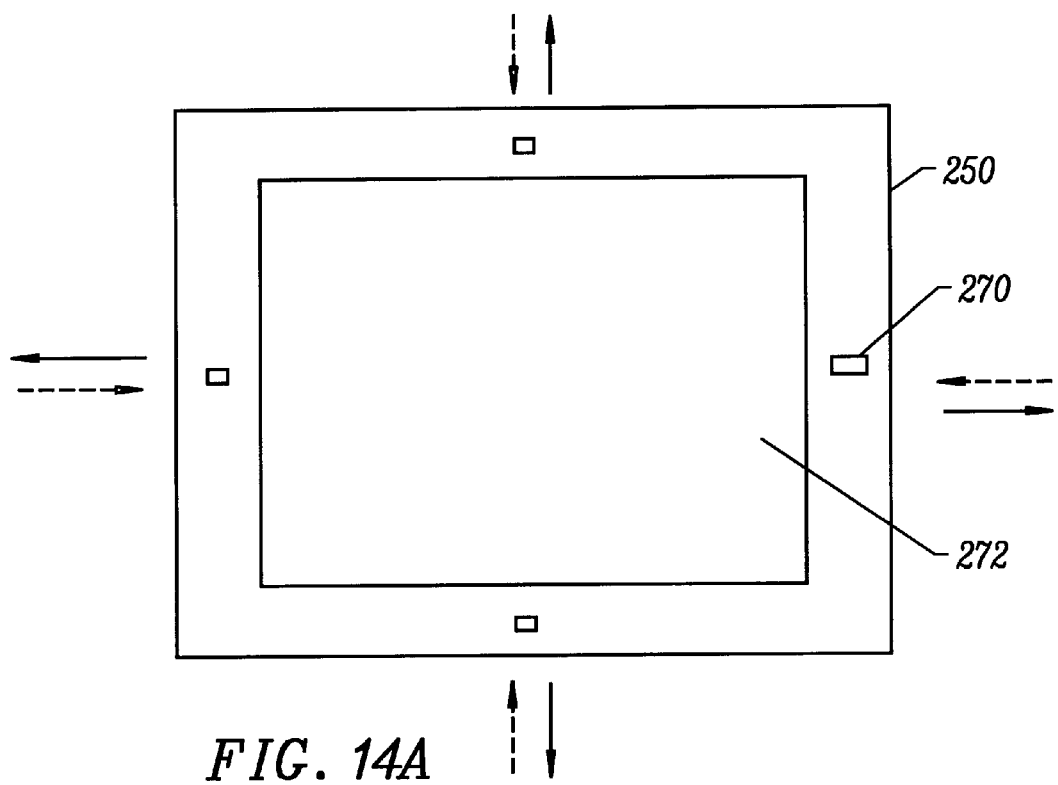
FIG. 14A illustrate a preferred orientation for an x-y voice coil scanner.
Figure 14B:
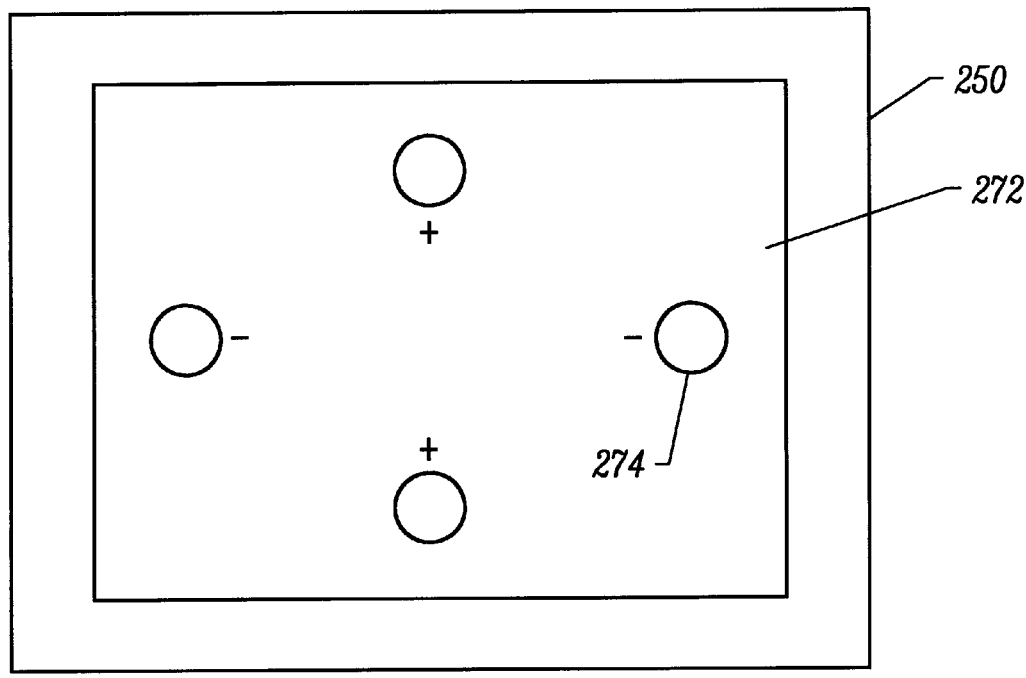
FIG. 14B illustrate a preferred orientation for a z voice coil scanner.

When a voice coil scanner is used, the magnets used in the voice coils are preferably oriented such that the impact of magnetic fields that may be present adjacent to the scanner is minimized. FIGS. 14A and 14B illustrate preferred orientations for an x-y and z voice coil scanner respectively.

As illustrated in FIG. 14A, for scanning in the x-y direction, the magnets 270 are preferably attached to either the fixed or moveable portion (shown in the figure as the moveable portion 272) and oriented such that the magnetic moments of all of the magnets 270 are directed outward away from the center of the moveable portion 272 (solid arrows) or inward toward the moveable portion 272 (dashed arrows).

As illustrated in FIG. 14B, for scanning in the z direction, the magnets 274 are preferably attached to either the fixed or moveable portion (shown in the figure as the moveable portion 272) and oriented such that the magnetic moments of the magnets 274 alternate in direction up and down.

The voice coil scanners of the present invention enable scanning over a distance of at least 5 mm, more preferably at least 10 mm and more preferably at least 30 mm. The voice coil scanners also enable scanning with precision to less than about $1\times10^{-9}$ m.

According to any one of the above embodiments, the voice coils are preferably driven by a current source.

Disk scanners, such as the ones described above, are also provided for use in scanning probe microscopes. The disk scanners may be incorporated into a scanning stage on which a sample may be placed, the scanning stage serving to move a sample relative to a stationary probe. The disk scanners may also be incorporated into a scanning probe microscope head, the scanner serving to move a probe relative to a stationary sample. The disk scanner may also be incorporated into an atomic force microscope which is designed to be incorporated into or attachable to an objective lens of an optical microscope.

While the present invention is disclosed by reference to the preferred embodiments and examples detailed above, it is to be understood that these examples are intended in an illustrative rather than limiting sense, as it is contemplated that modifications will readily occur to those skilled in the art, which modifications will be within the scope of the invention and the appended claims.

What is claimed is:

1. A scanning mechanism for use in a scanning probe microscope, the scanning mechanism comprising:
    a stationary portion;
    a moveable portion;
    a plurality of springs attaching the moveable portion to the fixed portion, the plurality of springs providing tension against movement of the moveable portion relative to the stationary portion, the tension provided by the plurality of springs having a substantially linear spring constant over a scan distance; and
    one or more voice coils attached to either the moveable portion or the stationary portion for moving the moveable portion relative to the stationary portion in one or more orthogonal directions.

2. The scanning mechanism according to claim 1 where the one or more voice coils move the moveable portion relative to the stationary portion in one or more orthogonal directions over a distance of at least 5 mm.

3. The scanning mechanism according to claim 1 where the one or more voice coils move the moveable portion relative to the stationary portion in one or more orthogonal directions over a distance of at least 10 mm.

4. The scanning mechanism according to claim 1 where the voice coil scanners move the moveable portion relative to the stationary portion with a precision to less than about $1\times10^{-9}$ m.

5. The scanning mechanism according to claim 1 where the plurality of springs are substantially rigid in a direction orthogonal to the one or more directions that the one or more voice coils move the moveable portion relative to the stationary portion.

6. The scanning mechanism according to claim 1 where the plurality of springs are oriented relative to the stationary and moveable portions such that movement of the moveable portion relative to the stationary portion in the one or more orthogonal directions causes bending of the plurality of springs, the plurality of springs being substantially unstretchable or compressible in at least one direction orthogonal to the one or more orthogonal directions.

7. The scanning mechanism according to claim 1 where the one or more voice coils move the moveable portion relative to the stationary portion in the x and y directions.

8. The scanning mechanism according to claim 1 where the one or more voice coils move the moveable portion relative to the stationary portion in the z direction.

9. The scanning mechanism according to claim 1 where the moveable portion includes a hole such that an optical view is provided through the scanning mechanism.

10. The scanning mechanism according to claim 1, further including a current source for driving the one or more voice coils.

11. A sample stage for use in a scanning probe microscope comprising:
    a stage for holding a sample; and
    a scanning mechanism for moving the stage, the scanning mechanism including
        a stationary portion
        a moveable portion;
        a plurality of springs attaching the moveable portion to the fixed portion, the plurality of springs providing tension against movement of the moveable portion relative to the stationary portion, the tension provided by the plurality of springs having a substantially linear spring constant over a scan distance; and
        one or more voice coils attached to either the moveable portion or the stationary portion for moving the moveable portion relative to the stationary portion in one or more orthogonal directions.

12. The scanning probe microscope stage according to claim 11 where the one or more voice coils move the moveable portion relative to the stationary portion in one or more orthogonal directions over a distance of at least 5 mm.

13. The scanning probe microscope stage according to claim 11 where the one or more voice coils move the moveable portion relative to the stationary portion in one or more orthogonal directions over a distance of at least 10 mm.

14. The scanning probe microscope stage according to claim 11 where the voice coil scanners move the moveable portion relative to the stationary portion with a precision to less than about $1 \times 10^{-9}$ m.

15. The scanning probe microscope stage according to claim 11 where the plurality of springs are substantially rigid in a direction orthogonal to the one or more directions that the one or more voice coils move the moveable portion relative to the stationary portion.

16. The scanning probe microscope stage according to claim 11 where the plurality of springs are oriented relative to the stationary and moveable portions such that movement of the moveable portion relative to the stationary portion in the one or more orthogonal directions causes bending of the plurality of springs, the plurality of springs being substantially unstretchable or compressible in at least one direction orthogonal to the one or more orthogonal directions.

17. The scanning probe microscope stage according to claim 11 where the one or more voice coils move the moveable portion relative to the stationary portion in the x and y directions.

18. The scanning probe microscope stage according to claim 11 where the one or more voice coils move the moveable portion relative to the stationary portion in the z direction.

19. The scanning probe microscope stage according to claim 11 where the moveable portion includes a hole such that an optical view is provided through the scanning mechanism.

20. The scanning probe microscope stage according to claim 11, further including a current source for driving the one or more voice coils.

21. A scanning probe microscope head comprising:
a mechanism for mounting a probe for use in scanning probe microscopy; and
a scanning mechanism for moving the probe including
a stationary portion,
a moveable portion,
a plurality of springs attaching the moveable portion to the fixed portion, the plurality of springs providing tension against movement of the moveable portion relative to the stationary portion, the tension provided by the plurality of springs having a substantially linear spring constant over a scan distance, and
one or more voice coils attached to either the moveable portion or the stationary portion for moving the moveable portion relative to the stationary portion in one or more orthogonal directions.

22. The scanning probe microscope head according to claim 21 where the one or more voice coils move the moveable portion relative to the stationary portion in one or more orthogonal directions over a distance of at least 5 mm.

23. The scanning probe microscope head according to claim 21 where the one or more voice coils move the moveable portion relative to the stationary portion in one or more orthogonal directions over a distance of at least 10 mm.

24. The scanning probe microscope head according to claim 21 where the voice coil scanners move the moveable portion relative to the stationary portion with a precision to less than about $1 \times 10^{-9}$ m.

25. The scanning probe microscope head according to claim 21 where the plurality of springs are substantially rigid in a direction orthogonal to the one or more directions that the one or more voice coils move the moveable portion relative to the stationary portion.

26. The scanning probe microscope head according to claim 21 where the plurality of springs are oriented relative to the stationary and moveable portions such that movement of the moveable portion relative to the stationary portion in the one or more orthogonal directions causes bending of the plurality of springs, the plurality of springs being substantially unstretchable or compressible in at least one direction orthogonal to the one or more orthogonal directions.

27. The scanning probe microscope head according to claim 21 where the one or more voice coils move the moveable portion relative to the stationary portion in the x and y directions.

28. The scanning probe microscope head according to claim 21 where the one or more voice coils move the moveable portion relative to the stationary portion in the z direction.

29. The scanning probe microscope head according to claim 21 where the moveable portion includes a hole such that an optical view is provided through the scanning mechanism.

30. The scanning probe microscope head according to claim 21, further including a current source for driving the one or more voice coils.

* * * * *